US006421426B1

United States Patent
Lucey

(10) Patent No.: US 6,421,426 B1
(45) Date of Patent: Jul. 16, 2002

(54) INFRARED WIRELESS HEADSET SYSTEM

(75) Inventor: Robert E. Lucey, Sudbury, MA (US)

(73) Assignee: GN Netcom/Unex Inc., Nashua, NH (US)

( * ) Notice: Subject to any disclaimer, the term of this patent is extended or adjusted under 35 U.S.C. 154(b) by 0 days.

(21) Appl. No.: 08/911,225

(22) Filed: Aug. 15, 1997

(51) Int. Cl.[7] .......................... H04B 10/00; H04B 1/38; H04M 1/00
(52) U.S. Cl. ...................... 379/56.3; 455/550; 455/575
(58) Field of Search ................... 379/56.3, 101; 455/462, 550, 575, 403, 568

(56) References Cited

U.S. PATENT DOCUMENTS

| | | | |
|---|---|---|---|
| 1,921,606 A | 8/1933 | Cremer | 174/116 |
| 1,981,612 A | 11/1934 | Chase | 174/13 |
| 3,288,916 A | 11/1966 | Koon | 174/103 |
| 3,562,451 A | 2/1971 | Mullen, Jr. et al. | 179/187 |
| 3,602,636 A | 8/1971 | Evans | 174/115 |
| 3,621,156 A | 11/1971 | Kllewer | 179/150 |
| 3,781,492 A | 12/1973 | Cragg et al. | 179/156 A |
| 3,796,841 A | 3/1974 | Gorman | 179/156 A |
| 3,971,900 A | 7/1976 | Foley | 179/156 A |
| 4,020,297 A | 4/1977 | Brodie | 179/156 A |
| 4,039,765 A | 8/1977 | Tichy et al. | 179/156 A |
| 4,241,236 A | * 12/1980 | Nash | 455/570 |
| 4,251,686 A | 2/1981 | Sokolich | 179/1 N |

(List continued on next page.)

FOREIGN PATENT DOCUMENTS

JP    359189760 A  * 10/1984  ................ 379/101

OTHER PUBLICATIONS

The IEEE Standard Dictionary of Electrical and Electronics Terms, Sixth Edition, IEEE STD 100–1996, Apr. 1997.*
*Communitext*, vol. 3 Issue 1 (pp. 1–16) Communitext is a publication of CommuniTech, Inc. Elk Grove Village, Ill.

Primary Examiner—Nay Maung
Assistant Examiner—Ray Persino
(74) Attorney, Agent, or Firm—Weingarten, Schurgin, Gagnebin & Lebovici LLP

(57) ABSTRACT

A full duplex infrared communication system suitable for use in connection with a telephone system is disclosed. The communication system includes a base station and a remote wireless set. High quality audio is provided through use of an FM sinusoidal current driven signal transmission between the base station and the remote wireless set. Further, transmission is made over bands which do not harmonically overlap. For example, the base station may transmit at 250–430 1 KHz and the remote wireless set may transmit at 1.45–1.63 MHz. Further, adverse effects of cross-talk and signal reflection are reduced by using transmission carrier signals for the base station and the remote wireless set having different wavelengths. For example, the base station may use LEDs which emit signals at a wavelength of 940 nm while the remote wireless set may use LEDs which emit signals at a wavelength of 880 nm. LEDs with slow turn-on and turn-off times, e.g., approximately 1 microsecond, are used in the Base TX to minimize harmonic radiation and Base RX desensitization. The remote TX LEDs are current driven, and have much faster turn-on and turn-off times than the Base TX LEDs, however its radiated fundamental and harmonics are much higher in frequency than the remote RX frequency and do not effect it during normal operating conditions. Further, the system does not require optical gain (lens, parabolic reflectors) and is omnidirectional.

23 Claims, 22 Drawing Sheets

U.S. PATENT DOCUMENTS

| | | | |
|---|---|---|---|
| 4,296,829 A | 10/1981 | Pederson | 181/129 |
| 4,335,281 A | 6/1982 | Scott et al. | 179/156 A |
| 4,549,042 A | 10/1985 | Akiba et al. | 174/114 R |
| 4,564,955 A | 1/1986 | Birch et al. | 381/69 |
| 4,588,868 A | 5/1986 | Bertagna et al. | 179/156 R |
| 4,617,431 A | 10/1986 | Scott et al. | 179/156 A |
| 4,659,878 A | 4/1987 | Dinkins | 370/71 |
| 4,677,675 A | 6/1987 | Killion et al. | 381/68.2 |
| 4,720,857 A | 1/1988 | Burris et al. | 379/430 |
| 4,757,553 A * | 7/1988 | Crimmins | 379/56.3 |
| 4,771,454 A | 9/1988 | Wilcox, Jr. | 379/430 |
| 4,774,434 A * | 9/1988 | Bennion | 313/500 |
| 4,879,746 A | 11/1989 | Young et al. | 379/399 |
| 4,882,745 A | 11/1989 | Silver | 379/61 |
| 4,893,344 A | 1/1990 | Tragardh et al. | 381/187 |
| 4,917,504 A | 4/1990 | Scott et al. | 381/187 |
| 4,932,052 A | 6/1990 | Lo | 379/430 |
| 4,951,002 A | 8/1990 | Hanon | 330/151 |
| 4,972,491 A | 11/1990 | Wilcox, Jr. | 381/187 |
| 4,975,949 A | 12/1990 | Wimsatt et al. | 379/387 |
| 5,058,155 A | 10/1991 | Larsen | 379/442 |
| 5,144,294 A * | 9/1992 | Alonzi et al. | 455/129 |
| 5,191,602 A | 3/1993 | Regen et al. | 379/58 |
| 5,210,791 A | 5/1993 | Krasik | 379/377 |
| 5,260,997 A | 11/1993 | Gattey et al. | 379/430 |
| 5,590,417 A * | 12/1996 | Rydbeck | 455/568 |
| 5,712,934 A * | 1/1998 | Johnson | 385/12 |
| 5,812,012 A * | 9/1998 | Jebens | 327/514 |

* cited by examiner

REMOTE UNIT RX

BASE UNIT RX

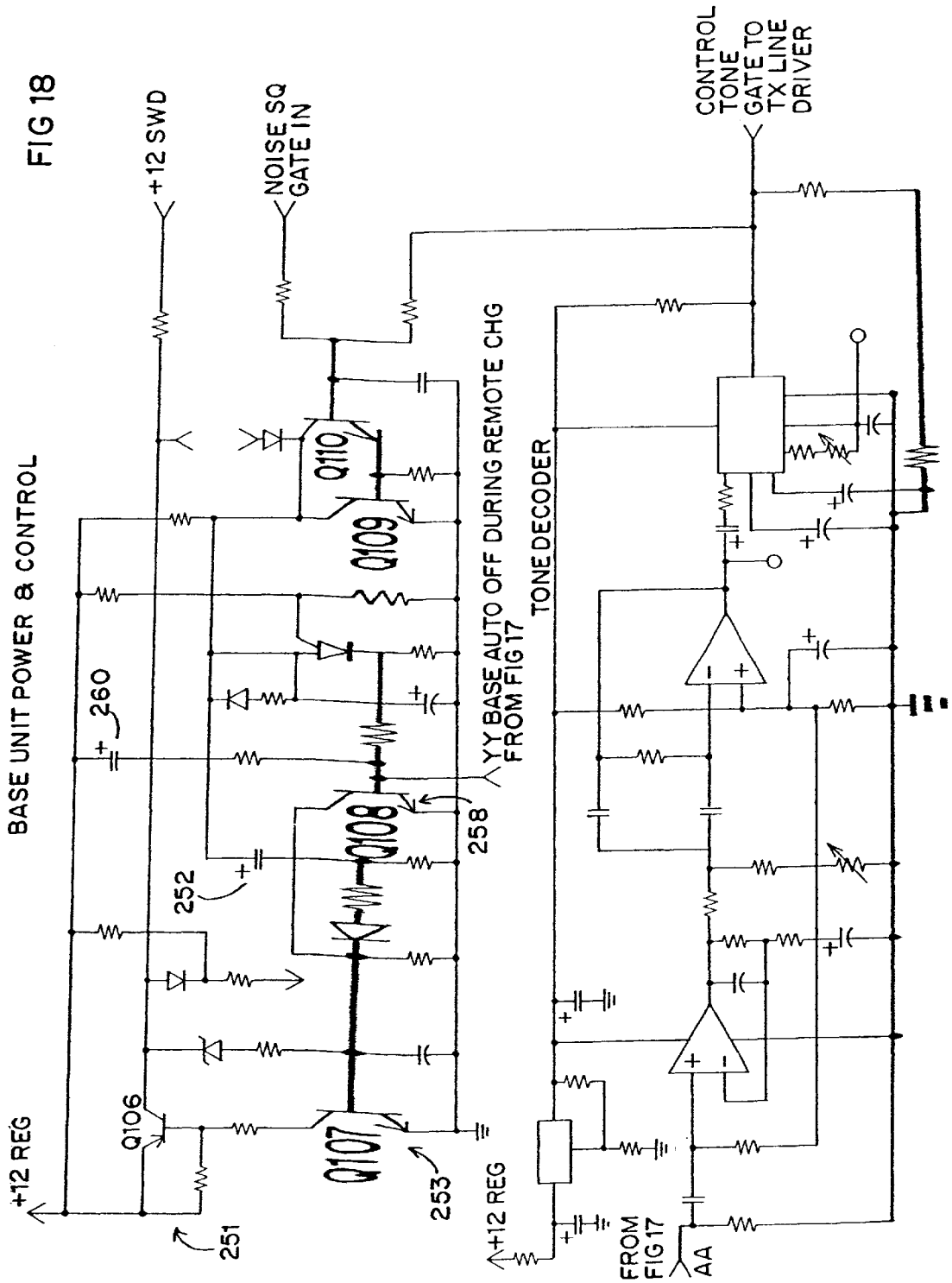

INFRARED WIRELESS HEADSET SYSTEM

CROSS REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

Wireless communication systems for interconnection with telephone systems are known. Such systems include a fixed transceiver which is connected to a telephone line and functions to relay signals to and from a remote device. Wireless systems allow substantial freedom of movement during a telephone conversation since the user is not limited by a fixed connection such as a telephone cord. However, some wireless systems provide relatively poor audio reproduction quality. More particularly, background noise and electromagnetic interference are significant sources of poor audio quality. Further, since the remote devices in such wireless systems are typically battery powered, power consumption is an important concern. It is therefore desirable to have a wireless communication system which provides energy efficient operation, high quality audio, security, and which reduces interference between closely spaced units.

BRIEF SUMMARY OF THE INVENTION

In accordance with the present invention, a wireless communication system for use in connection with a telephone system includes a first transceiver with a first transmit circuit and a first receive circuit, said first transceiver being connected to the telephone system; and a second transceiver with a second transmit circuit and a second receive circuit, wherein the first and second transmit circuits transmit signals and the first and second receive circuits receive the signals from the second and first transmit circuits, respectively. In further accordance with the present invention, distinct signal transmission bands and carrier signal wavelengths may be employed to further improve audio quality.

Improved audio quality is provided by the communication system of the present invention with several advantageous features. Improved audio quality is provided by using FM sinusoidal current signal transmission between the base station and the remote wireless set. The FM sinusoid current signal transmission is advantageously resistant to the electromagnetic interference which negatively effects some known systems. Improved audio quality is also provided by transmitting at frequencies which avoid excessive harmonic overlap. For example, the first transceiver, which may be a base station, may transmit at 250–430 KHz while the second transceiver, which may be a remote wireless set, may transmit at 1.45–1.63 MHz. Improved audio quality is also provided by sending transmissions from the first transceiver with a carrier signal having a different wavelength than that with which transmissions are sent from the second transceiver, thus reducing cross-talk and reflection problems. LEDs which emit signals at a wavelength of 940 nm may be employed by the base station while the remote wireless set may employ LEDs which emit signals at a wavelength of 880 nm.

In addition to the above advantages, infrared communication offers inherent advantages insofar as IR signals are generally confined to the room in which they are transmitted. As such, IR systems provide a measure of privacy which is not ordinarily available in wireless communication systems. Further, systems can be used in close proximity without interference, for example in adjacent rooms. The present invention also reduces receiver desensitization problems.

BRIEF DESCRIPTION OF THE DRAWING

Other features and advantages of the present invention will be apparent from the Detailed Description of the Preferred Embodiment and the Drawing, in which:

FIGS. 17 and 18 are detailed schematic diagrams of the power and control systems.

DETAILED DESCRIPTION OF THE PREFERRED EMBODIMENT

Figure 1:
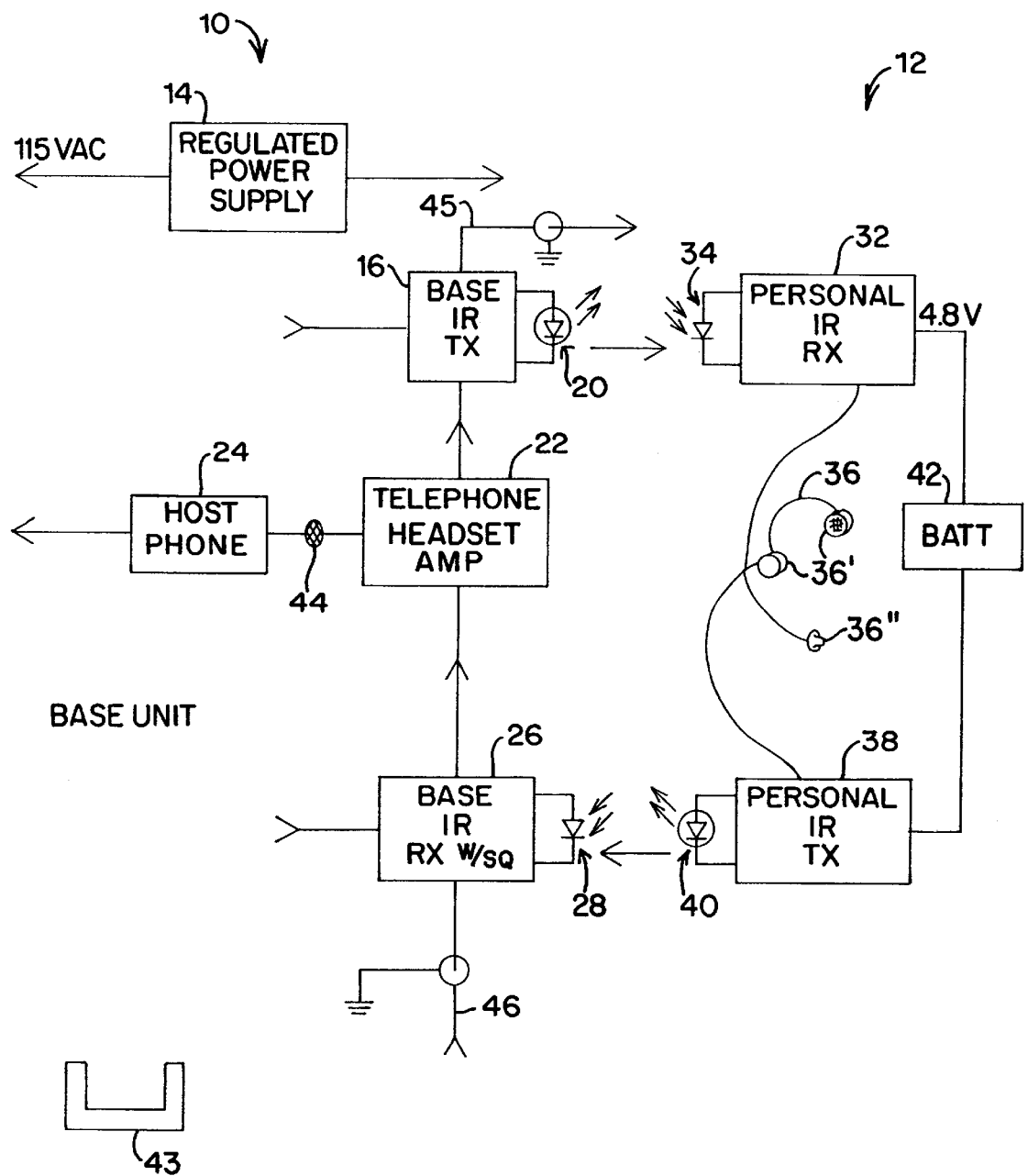
FIG. 1 is a block diagram of an infrared communication system including the base unit and remote unit.
Figure 2:
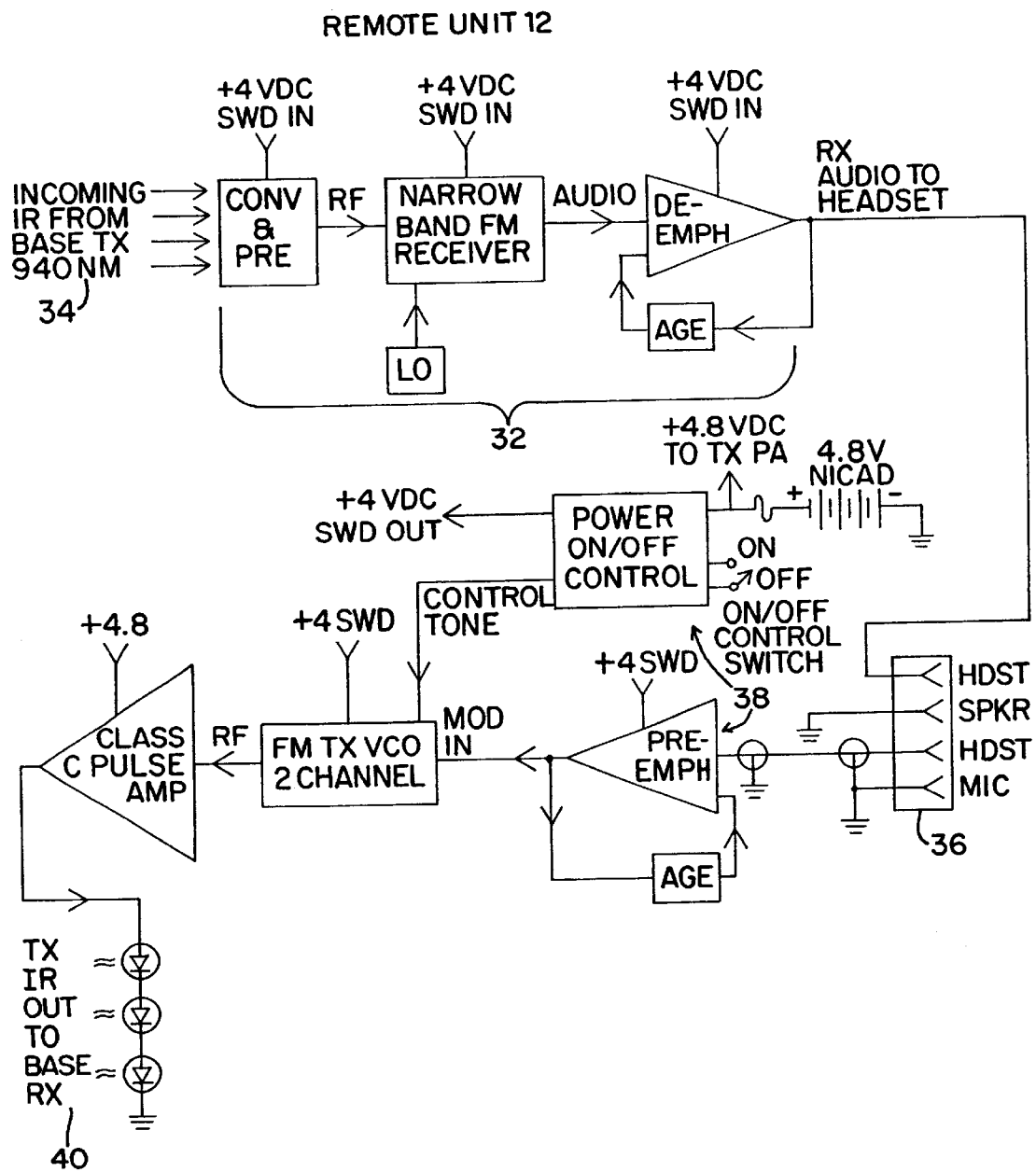
FIG. 2 is a block diagram of the remote unit.
Figure 9:
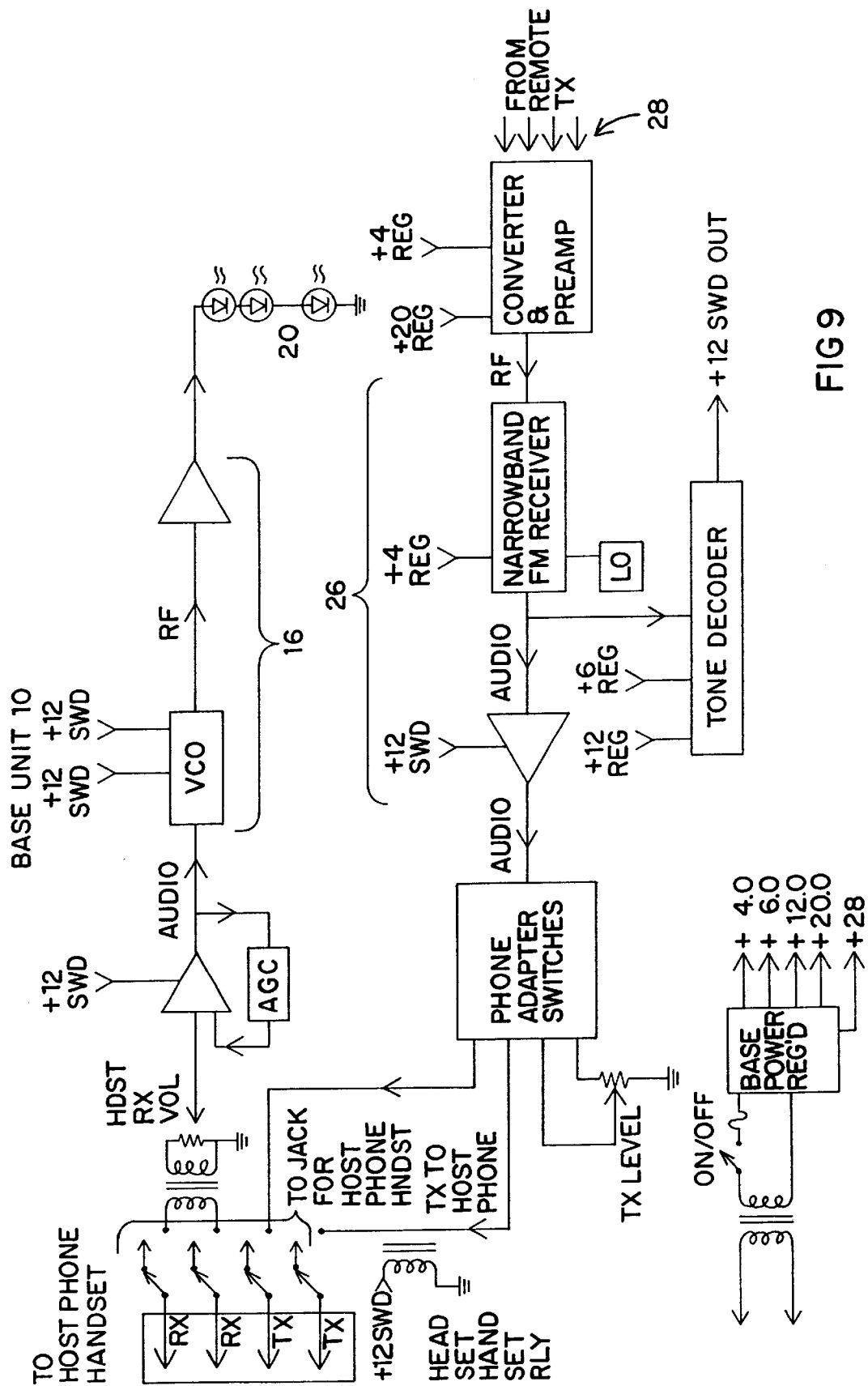
FIG. 9 is a block diagram of the base unit.

The present invention provides in its preferred embodiment a wireless remote telephone which communicates via infrared link to a stationary relaying device. Referring to FIGS. 1, 2 and 9, the system includes a base station 10 and a remote wireless set 12. The base station 10 has a regulated power supply 14, an infrared (IR) transmitter 16 with IR LEDs 20, a telephone headset amplifier 22, a host telephone 24 and an IR receiver 26 with PIN diodes 28. The wireless set has an IR receiver 32 with PIN diodes 34, a headset 36, an IR transmitter 38 with IR LEDs 40, and a battery 42.

The base station 10 and wireless set 12 provide full duplex voice exchange and control signal transmission over an IR link for controlling access to PBX or local exchange telephone lines via a host phone. Control signals switch the headset (Base ON) or handset (Base OFF). Such signals may be used for controlling access to local phone lines with the addition of a hybrid to the base unit and a dialer to the remote unit. The base station transmitter receives audio signals 44 from the telephone lines for transmission through either IR diodes 20 or an optional coaxial cable 45. An optional coaxial cable 45 is connected to a remote IR transmitter for increased coverage in the same or another room. Signals transmitted by the IR diodes 20 are received by the set of PIN diodes 34 within the receiving environment, typically a single room or a single room and a limited area outside such room as for example through an open doorway, via direct and wall, ceiling and floor illumination. The signals from the host phone 24 are provided from a handset jack thereof and are processed in the headset amplifier 22 for use by the transmitter 16. Similarly, the headset amplifier 22 receives incoming audio signals from the base IR receiver 26 via PIN diodes 28 or optional coaxial cable 46 from a remote receiver. The noise squelch selects the remote receiver based upon the best signal to noise ratio. The telephone headset amplifier 22 may also be provided with a switching circuit for selecting appropriate microphone characteristics expected by the host telephone 24 so that incoming and outgoing signals are appropriately conditioned for the particular type of host telephone 24. The telephone headset amplifier 22 may also include a switching circuit to permit switching between the remote wireless and the standard handset normally associated with the host telephone.

The headset 36 includes ear pieces 36' and a microphone 36" for reproducing signals from the receiver 32 and applying speech to the transmitter 38, respectively. Outgoing signals are processed in the remote wireless set 12 by transmitter 38 for application to emitting IR diodes 40.

The remote wireless set 12 IR receiver 32 processes signals from the base station with IR sensitive devices such as PIN diodes 34. A rechargeable battery 42 powers both the receiver 32 and transmitter 38, including diodes 40, and can be recharged when the remote wireless set 12 is placed in a charge cavity 43 which is associated with and powered from the base station 10.

The system provides improved audio quality with several features. First, audio quality is improved by using frequency modulated sinusoidal current driven signal transmission between the base station and the remote wireless set. Second, audio quality is improved by transmitting at frequencies which avoid excessive harmonic overlap. The base station transmits at 250–430 Khz and the remote wireless set transmits at 1.45–1.63 Mhz. Audio quality is also improved by applying Dynamic Noise Reduction to the output of the base receiver, which provides the transmit (mic) signal for the host phone. This filters out noise caused by weak IR signals to the base receiver. Finally, audio quality is improved by sending transmissions from the base station with a carrier having a different wavelength than that with which transmissions are sent from the remote wireless set, thus reducing cross-talk. LEDs which emit signals at a wavelength of 940 nm are used by the base station while the remote wireless set uses LEDs which emit signals at a wavelength of 880 nm. Also, the base station LEDs 20 are relatively slow (1 microsecond ON/OFF time) and are continuously driven.

Figure 3A:
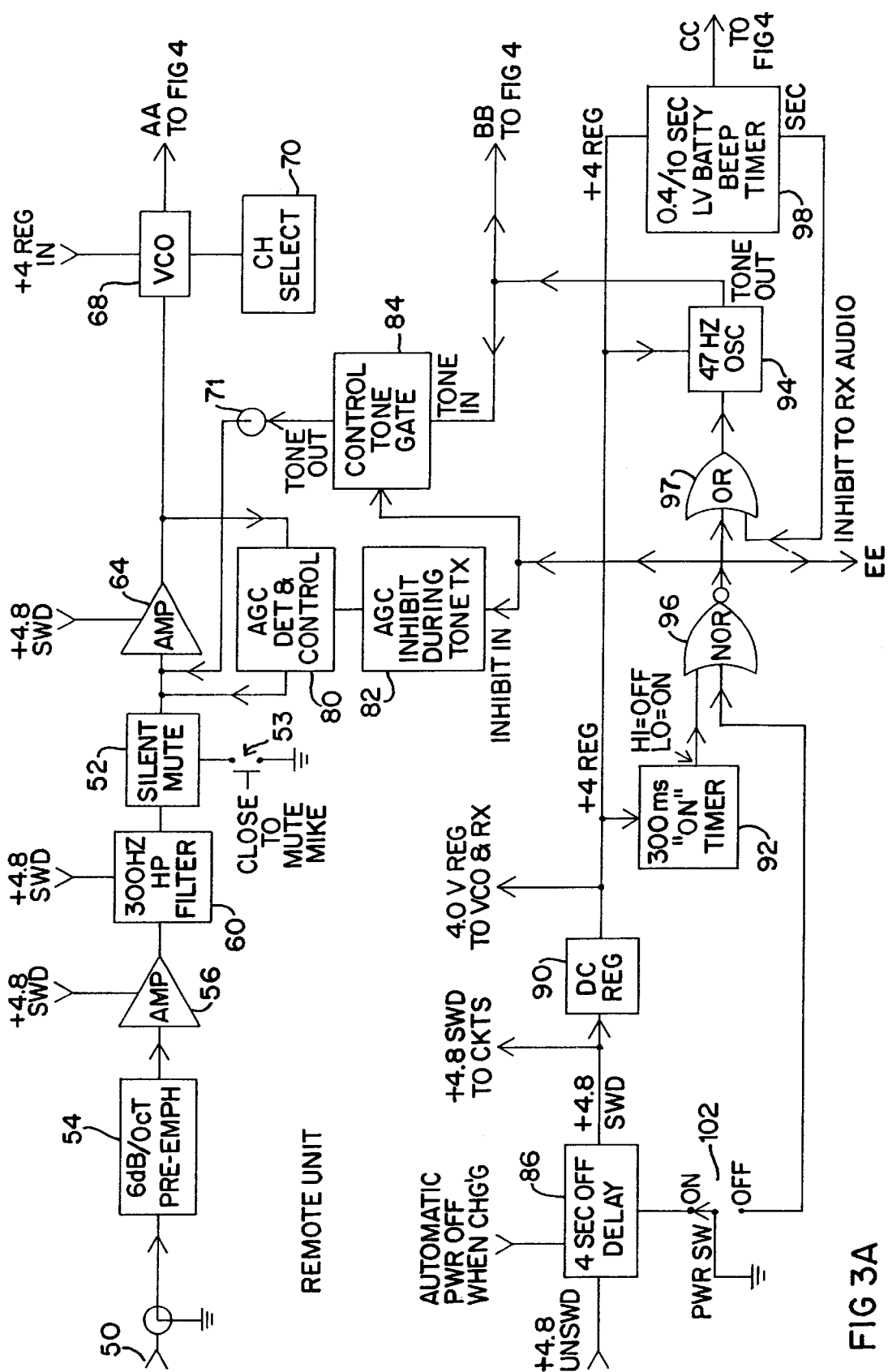
FIGS. 3 and 4 are expanded block diagrams of the remote unit.
Figure 3B:
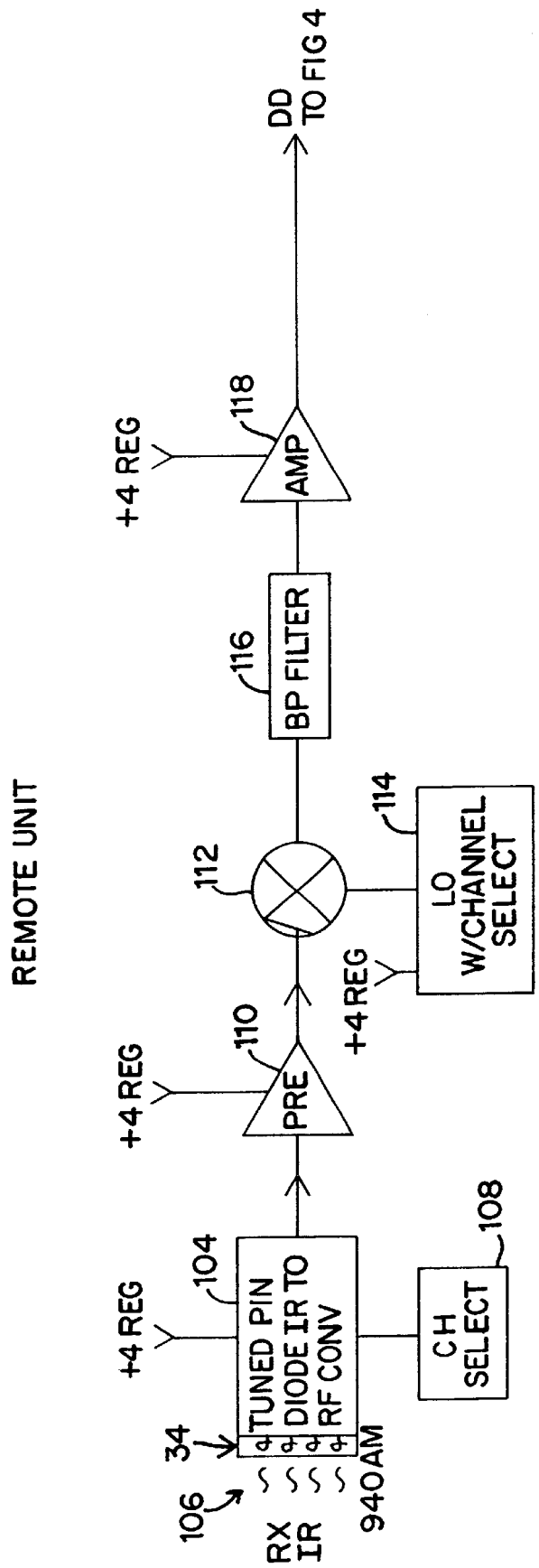
Figure 4:
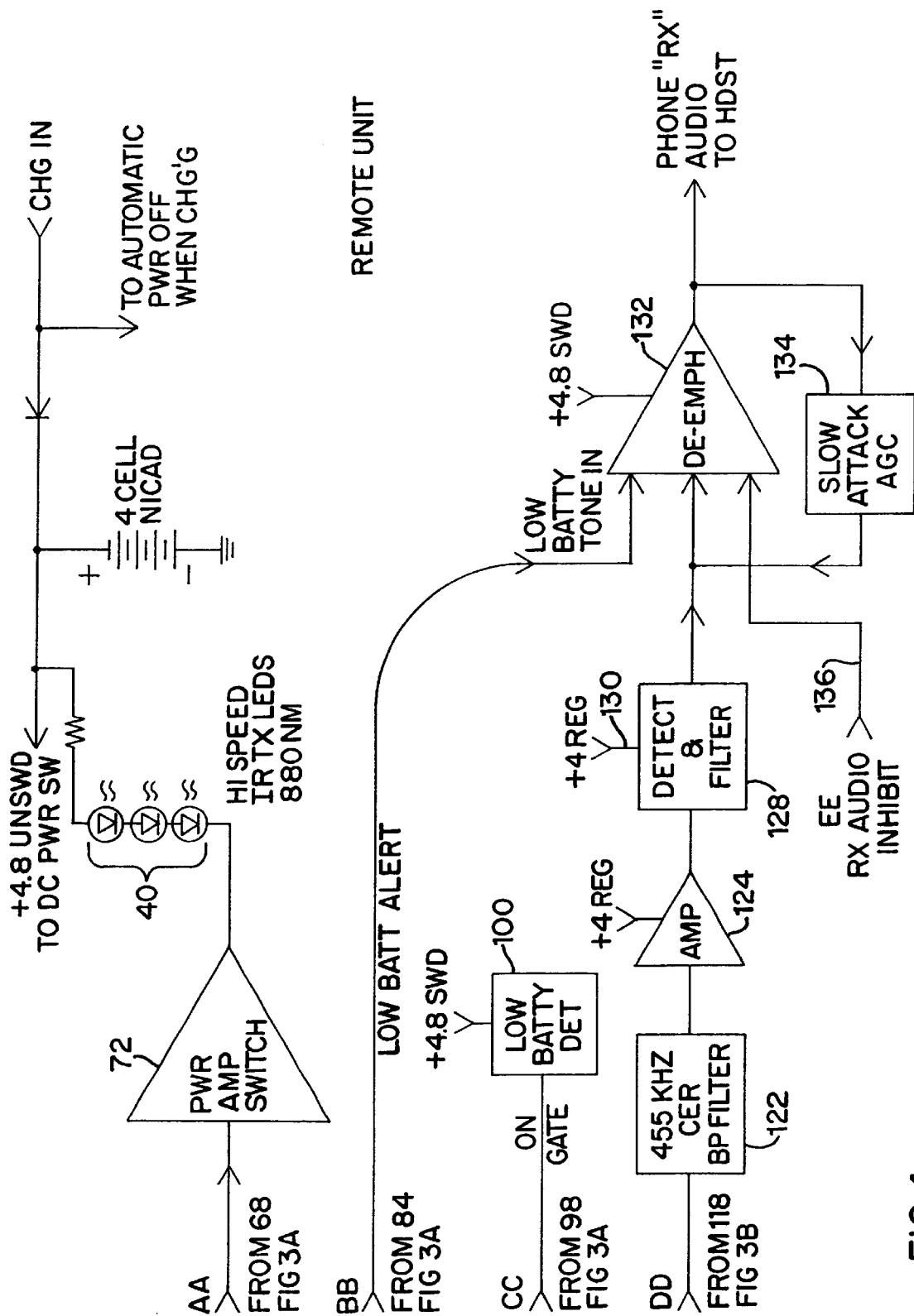
Figure 5:
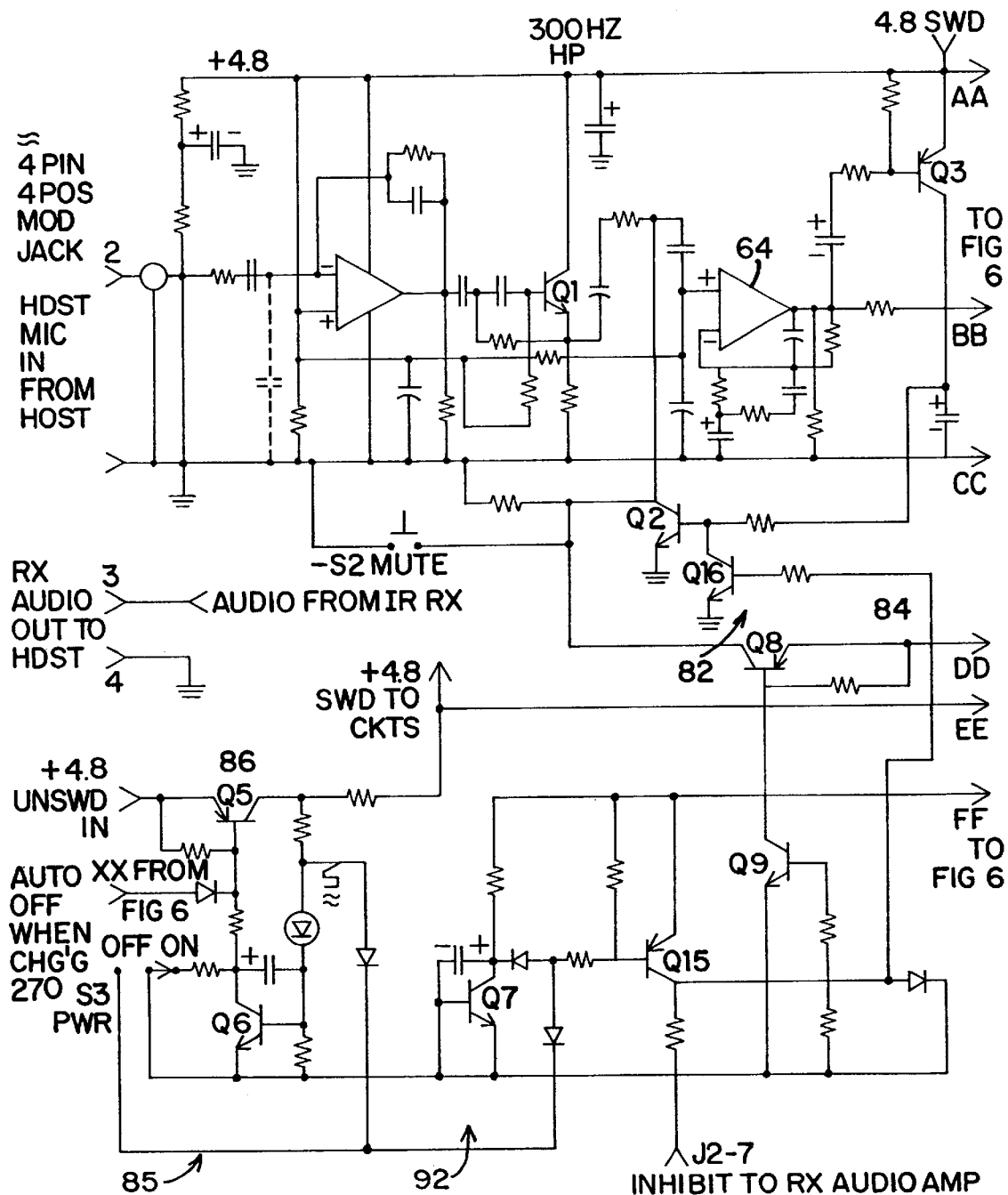
FIGS. 5 and 6 are detailed schematic diagrams of the remote transmitter.
Figure 7:
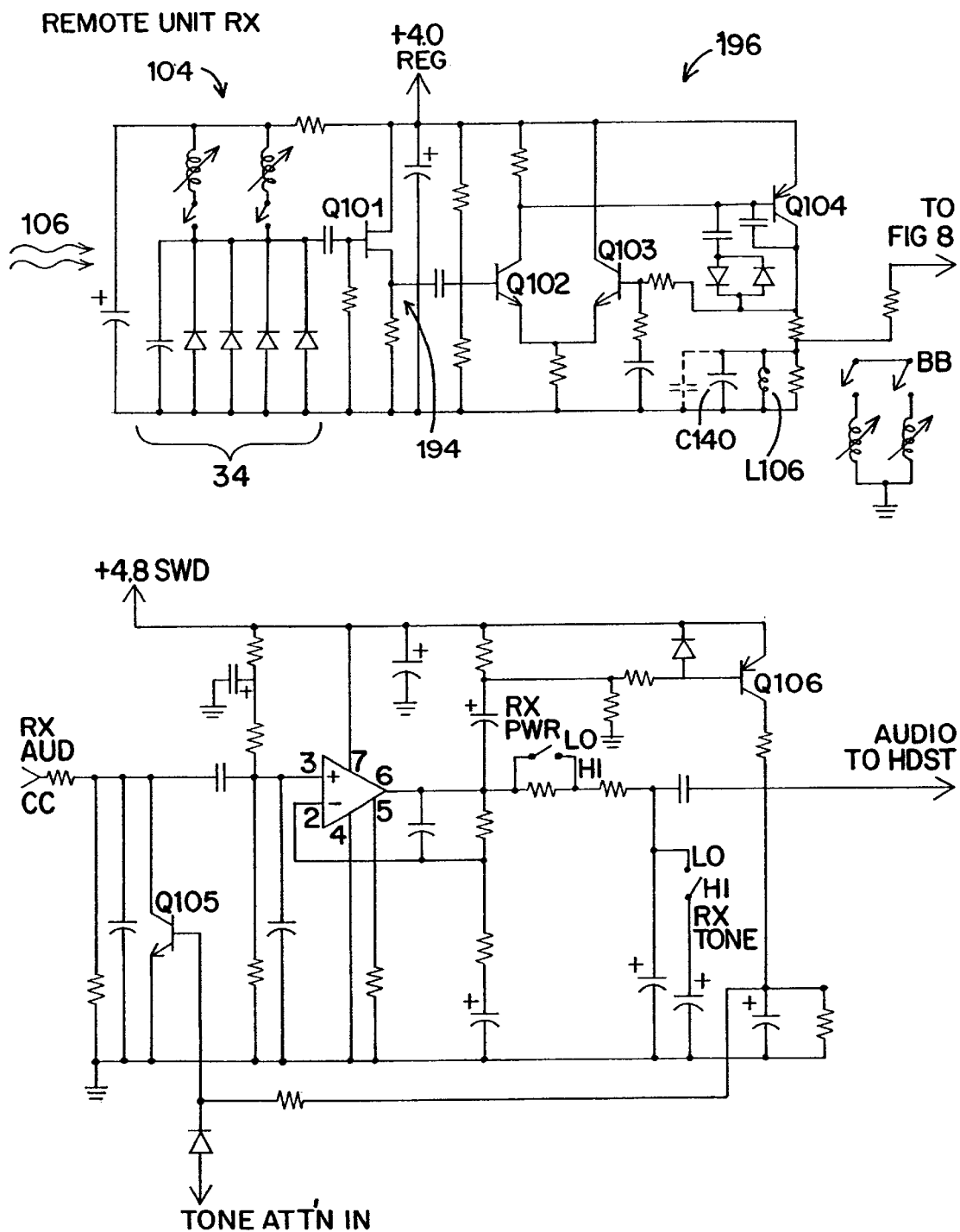
FIGS. 7 and 8 are detailed schematic diagrams of the remote receiver.
Figure 8:
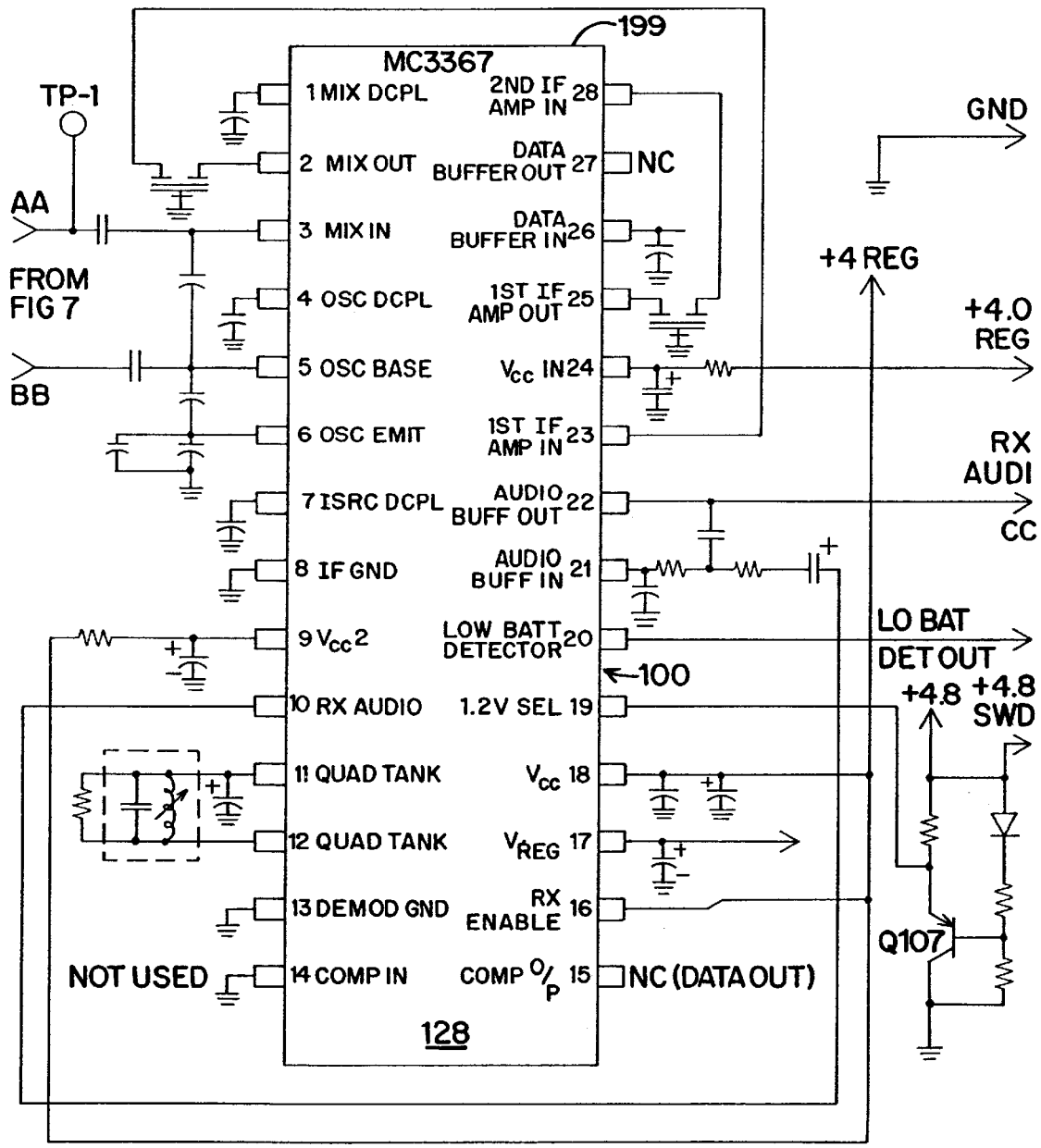

FIGS. 3 and 4 are block diagrams of the remote wireless set 12, and FIGS. 5, 7 and 8 illustrate detailed circuit components corresponding to those labeled in FIGS. 3 and 4.

The following description will be referenced primarily to the elements of the block diagrams of FIGS. 3, 4, 5, 6, 7 and 8 where particular attention is directed to circuit-level components.

The remote wireless set includes circuitry for transmitting and receiving both audio and control signals via frequency modulated IR pulses. Audio signals from the headset microphone 36" (FIG. 1) are applied at an input 50 (FIG. 3) to a 6 Db per octave preemphasis 54. The output of the preemphasis 54 is applied to an amplifier 56. The output of the amplifier 56 is applied to a high pass filter 60 with a low-frequency cutoff point of 300 Hz for tone control purposes. The low-frequency cutoff prevents low frequency components in the voice signal from passing further into the circuitry and interfering with tone control signals, which are added for tone control purposes as described below. The tone control signals are applied between a mute function 52 and a subsequent amplifier 64. A mute switch 53 is provided to silently short circuit the signal path to ground when desired. The amplifier 64 includes an automatic gain detect and control circuit (AGC) 80 which is of particular value for FM signal modulation. The output of the amplifier 64 is applied to a voltage controlled oscillator (VCO) 68 which comprises an asymmetrical oscillator which is frequency modulated by the signal from the amplifier 64. A channel select system 70, illustrated for two channels, but operable for as many channels as desired, is illustrated in particular detail in FIGS. 5 and 6. The VCO 68 includes a deviation adjustment potentiometer 67 which is connected to the output from the amplifier 64. The VCO 68 provides a narrowband FM output which is applied to a power amplifier/switch 72, thereby driving the transmission LEDs 40 with a frequency modulated current signal. The LEDs 40 operate typically in the 880 nm optical output range and are driven in a 1.45–1.63 Mhz frequency band.

Referring to FIGS. 3 and 7, the remote wireless set receives incoming signals 106 from the base station with an IR sensitive device such as a tuned PIN diode detector 104. The PIN diodes 34 are receptive to the 940 nm IR wavelength corresponding to the base station transmission LEDs 20 (FIG. 1), and are arranged in a tuned parallel circuit. A channel selector 108 operates to select a predetermined receive signal in the 250–430 Khz frequency band in which the frequency modulated sinusoidal current driven signal from the base station is transmitted. The PIN diodes 34 are physically arranged for the broadest possible view. More particularly, two PIN diodes are tilted at 30–45 degrees for better left and right side views.

The signal received by the PIN diodes 34 is processed to provide an audio signal. The PIN diodes drive a high speed JFET 194. The output from the JFET 194 is applied to a limiting preamplifier 110 which includes a limiting circuit. A parallel tuned circuit is used at the output of preamplifier 196 to filter out harmonics generated when strong signals cause the preamplifier to go into limiting.

Referring to FIGS. 3 and 8, the output from the preamplifier 196 is applied to an integrated circuit 199 which includes FM detection amplification and filtering circuitry to be described as the remainder of the receiver section of the receive station. In particular, the output of the preamplifier is applied to a mixer 112 within IC 199, which is typically a Motorola MC3367DW. A signal from a low-frequency channel selected local oscillator 114 is also provided to the mixer in IC 199. The output of the mixer 112 is provided to a 455 Khz intermediate frequency ceramic bandpass filter 116, the output of which is in turn reinjected into the IC at an amplifier stage 118.

Referring to FIGS. 4 and 8, the output from the amplifier stage passes through a further 455 Khz ceramic filter 122, and is reinjected into an internal amplifier 124 in the IC 199. A quad detector 128 which includes a 3 Khz low pass filter is also provided within the IC. The output of the detector from the IC is applied through an audio amplifier 132 which provides deemphasis in a deemphasis circuit. A tone and loudness control 136 is provided for personal tailoring. An AGC feedback circuit 134 associated with the audio amplifier 132 provides automatic gain and loudness control and limits Sound Pressure Level to a safe level as is desirable in such an FM system, and for substantially adjustment-free operation. This is a slow attack AGC which reduces the power output to a comfortable level when there is a continuous tone or noise, which can occur if the user walks out of the room.

Referring again to FIGS. 3, 4, 5 and 6, the power supply and tone-control circuits are shown to include unswitched +4.8 volt DC which is supplied to a DC power switch 86 with a 4 second OFF delay 85. An ON-OFF power switch 102 is operative to turn system power ON and OFF. A +4.8 volt switched output of the DC power switch 86 is applied to a 4 volt DC regulator 90. Unswitched, switched and regulated voltages are applied as indicated throughout the circuits illustrated in the referenced FIGS. Unswitched power is utilized for the LEDs 40, which only conduct upon input from the power amplifier switch 72. The regulated +4 volts is applied to a 0.3 second ON timer 92. The 0.3 second ON timer generates a 0.3 second ON signal when power is applied which is supplied to a NOR gate 96 at power ON. The output of NOR gate 96 is applied to an OR gate 97 whose output is supplied to a 147 Hz oscillator 94, which produces a tone. The oscillator 94 is thus triggered to produce a tone (here, an ON signal) at turn-ON for 0.3 seconds.

The output of oscillator 94 provides tone control signals 71 to the remote transmitter through a tone control gate 84. The tone control gate 84 is activated by the output of the NOR gate 96 to inject a tone into the transmission path prior to amplifier 64. An AGC inhibit circuit 82 is also activated by the NOR gate 96 and disables the AGC circuitry 80 to allow a strong control tone to be transmitted. The tone control signals in the remote unit switch the base unit transmitter ON for headset mode and OFF for handset mode. The signals could also be used for "operator flash."

Referring to FIGS. 4, 6, 7 and 8, the IC 199 includes a low-battery detector 100. The low-battery detector has an output which indicates a low battery by switching on a 0.4 second low-battery timer 98 which provides a 0.4 second signal through OR gate 97 to activate the 147 Hz tone oscillator 94. The resultant tone is applied to the audio amplifier 132 to provide an indication in the user's headphone of the battery condition.

A parallel resonant circuit including C140 and L106 may be added to the output circuit of RF amplifier Q104 in the remote receiver to eliminate "birdies" caused by mixing of F1 and F2 harmonics with harmonics of the receiver local oscillator. The circuit is tuned approximately midway between channel frequencies F1 and F2 and has a Q of approximately 4–5. The circuit significantly reduces harmonics of F1 and F2 generated when strong signals cause the RF amplifier to go into limiting.

FIGS. 9, 10, 11, 12, 15, 16, 17 and 18 illustrate the base station. The base station functions to relay signals between the remote wireless set and a local telephone system. A connecting jack 152 provides connection between the host telephone and the base station. The base station accesses the local telephone system through the host telephone. A set of relay contacts 150 control connection of the host phone to either the host phone handset or to the base station (headset mode). As such, the user may use either the host telephone or the remote wireless set for telephone communication. Switch 186 provides equalization for carbon and electronic microphones and appropriate loading therefor.

In order to relay signals, the base station is operative to convert audio signals from the local telephone system into frequency modulated current driven signals which are transmitted to the remote wireless set. Audio signals from the local telephone system enter the base station through connecting jack 152 and relay contacts 150, and are applied to a transformer 156. The output of the transformer is applied to an amplifier 158 through an amplitude clipping circuit 157. The amplitude clipping circuit 157 functions to limit abnormally high level signals to prevent overloading and disabling of the AGC circuit. An AGC circuit 160 provides AGC control feedback around the amplifier 158. The output of amplifier 158 is applied through a preemphasis network 162 including an amplifier with preemphasis in the negative feedback for compatibility with FM transmission. The output of the preemphasis circuit 162 is applied to an amplifier 164. The output of the amplifier 164 is applied to a voltage controlled oscillator (VCO) 168, the frequency range of which is determined by a channel selector circuit 172 with switch selectable resistors which provide current control of the 12 volt power supply to the VCO 168. R274 and C248 in amplifier 158 provide high frequency boost for better receiver audio high frequency response. Additionally, for the first three of the seven channels shown, a shunt circuit 165 is provided to reduce gain for the other channels and thereby accommodate lower deviation sensitivity on the first three channels in the modulated output. The VCO 168 has a temperature compensating capacitor 169 which is applied to PIN 7 of an exemplary LM 566 CN component used as the VCO. The output of the VCO is applied to a buffer amplifier 174 and subsequently to an active low pass filter 178 with a 650 Khz low-frequency cutoff point. An optional satellite transmission source input 176 can be supplied at this point if desired. The output of the filter 178 is applied to a power amplifier 180 which includes a further 650 Khz low pass filter. The power amplifier 180 drives the transmission LEDs 20. A power shunt can optionally be included for increasing the range of the emitted IR signals.

As shown in FIGS. 10, 11, 13 and 14, incoming frequency modulated signals received by the base unit are converted starting at 192 to audio signals and relayed to the local telephone system. The incoming frequency modulated signals are received on tuned PIN diodes 28 which are connected to channel selecting tuneable inductors 194 which control the center resonant receive frequency. A high pass filter capacitor 195 connects the PIN diodes 28 to a high impedance buffering amplifier FET 197 which is capacitively coupled to a preamplifier 196 having limiting diodes 196' to control amplitude and prevent mixer overload. The limited output of the preamplifier 196 is applied to an MC 3367 IC 113, within which the remaining FM detection circuitry is provided. In particular, the output of the preamplifier 196 is applied to the input of a mixer 198. Frequency tuning inductors in a channel selector system 200 are connected into the IC 113 to select the appropriate LO frequency for the mixer. The output of the mixer 198 is applied through a ceramic filter 202 at the mixer output of the IC and reinputted to the IC at an amplifier 204. The amplifier output is applied through a further ceramic filter 205, with a 455 Khz center frequency. The output of the ceramic filter is amplified in an amplifier 208 and supplied to a quad detector 210. Within the IC, the quad detector 210 provides FM detection. The output of the quad detector is reinserted through a low pass filter 212. The output of the low pass filter 212 is applied to a TX amplifier 218 which also has de-emphasis. The output of the amplifier 218 is applied to the Dynamic Noise Reduction ("DNR") 219 which drives transmitter line driver 221 which feeds a local telephone system through a transmission line level adjust 188, the mode select switch 186 and relay contacts 150.

Figure 10A:
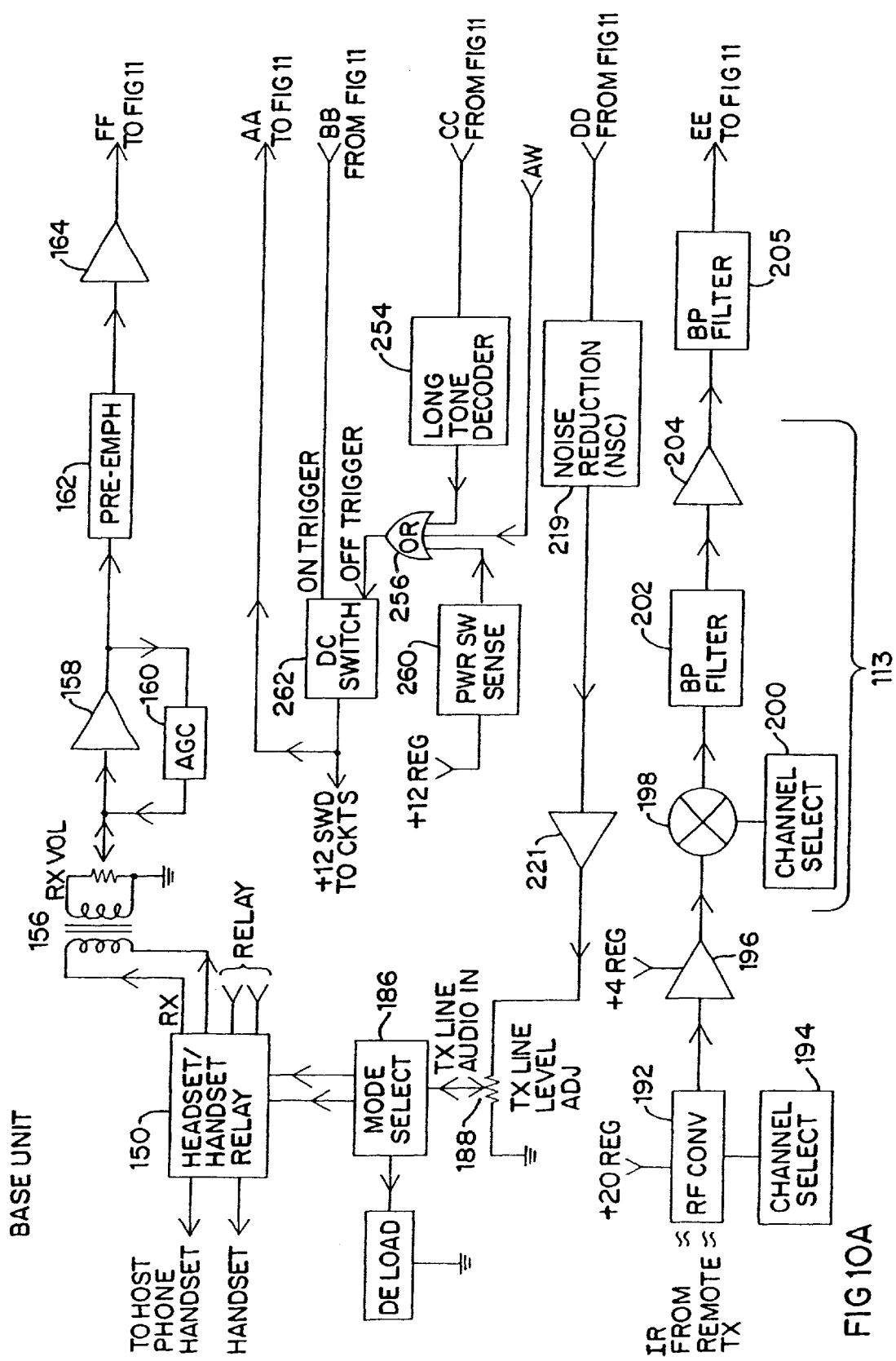
FIGS. 10 and 11 are expanded block diagrams of the base unit.
Figure 10B:
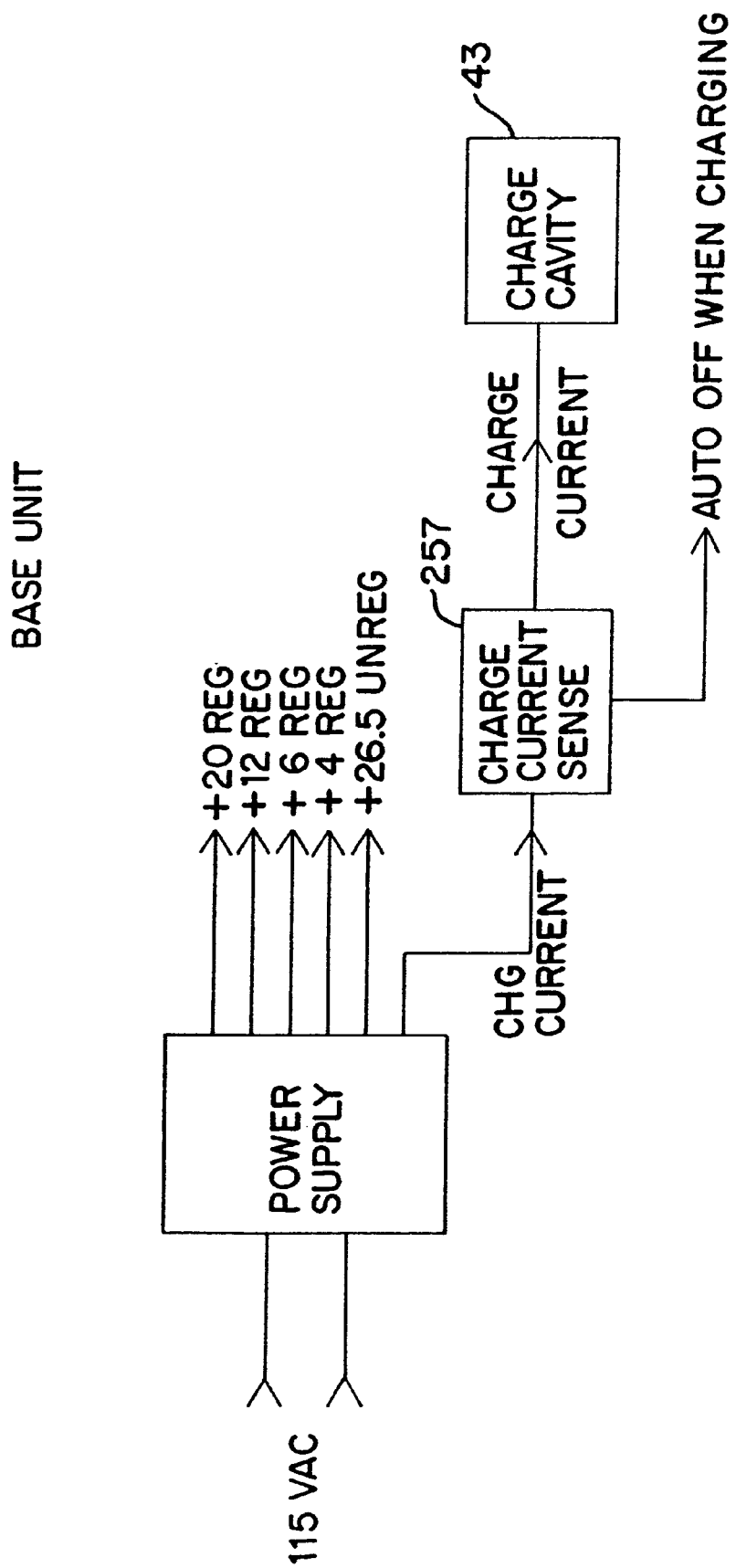
Figure 11:
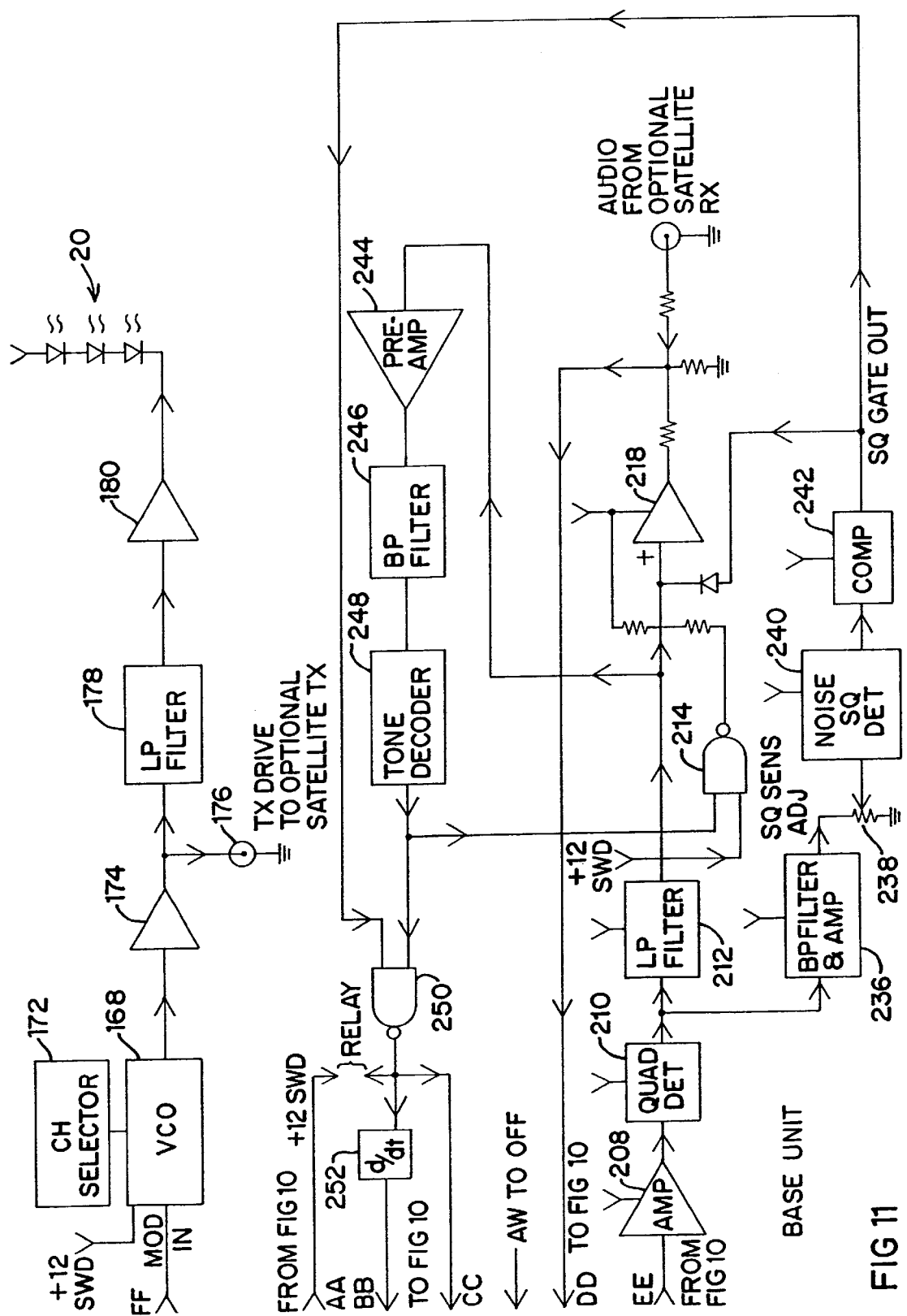
Figure 12:
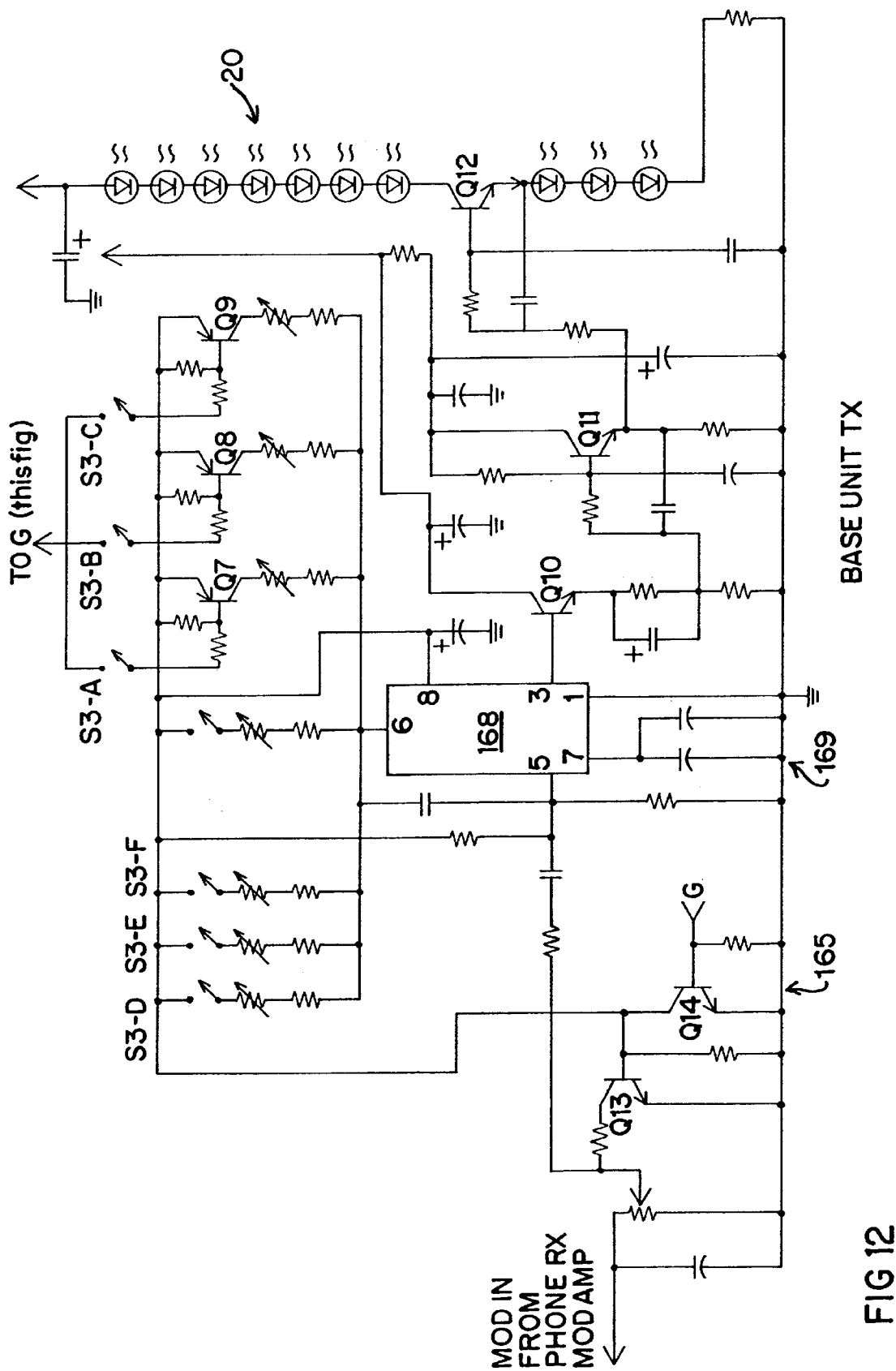
FIG. 12 is a detailed schematic diagram of the base transmitter.
Figure 13A:
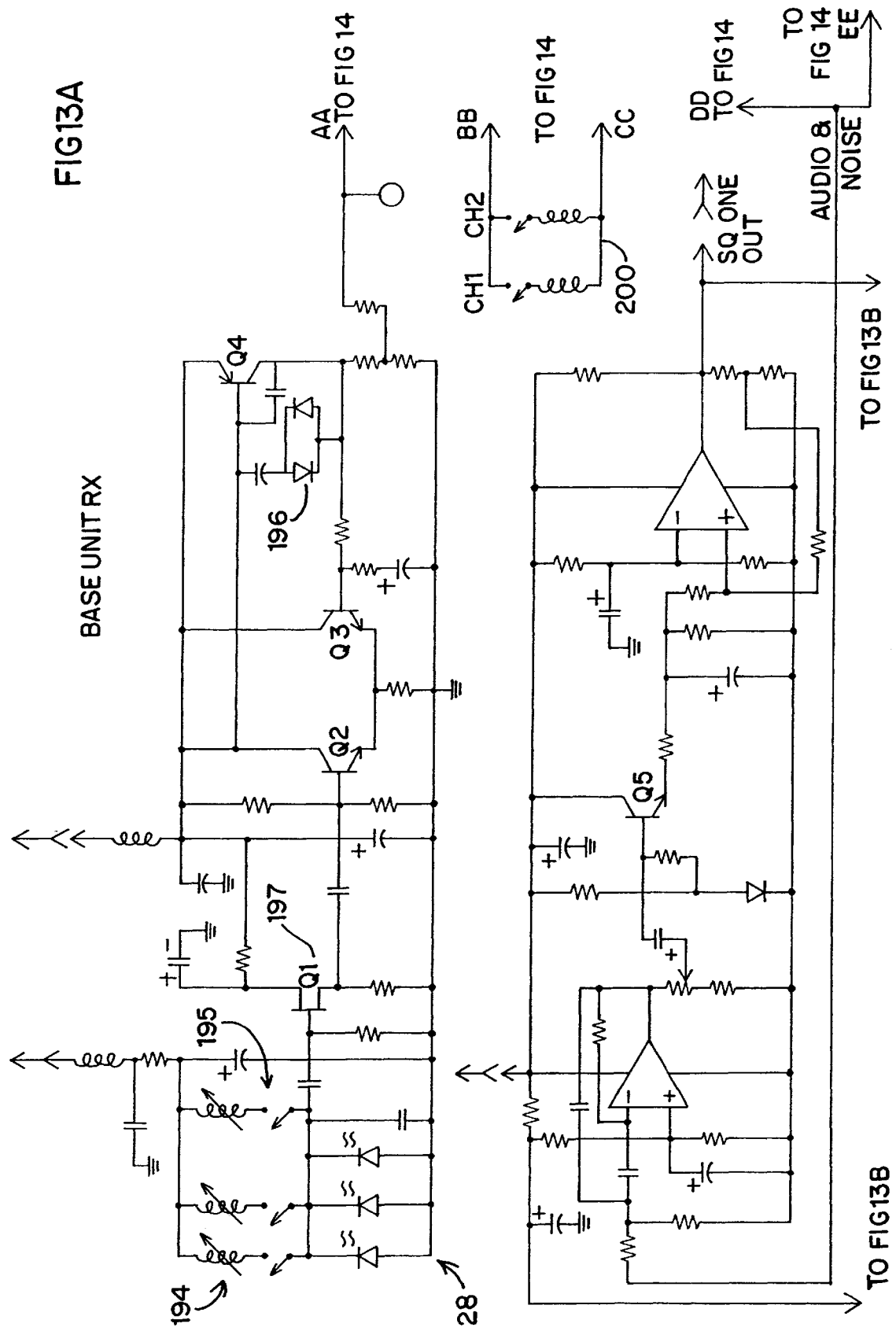
FIGS. 13 and 14 are detailed schematic diagrams of the base receiver.
Figure 13B:
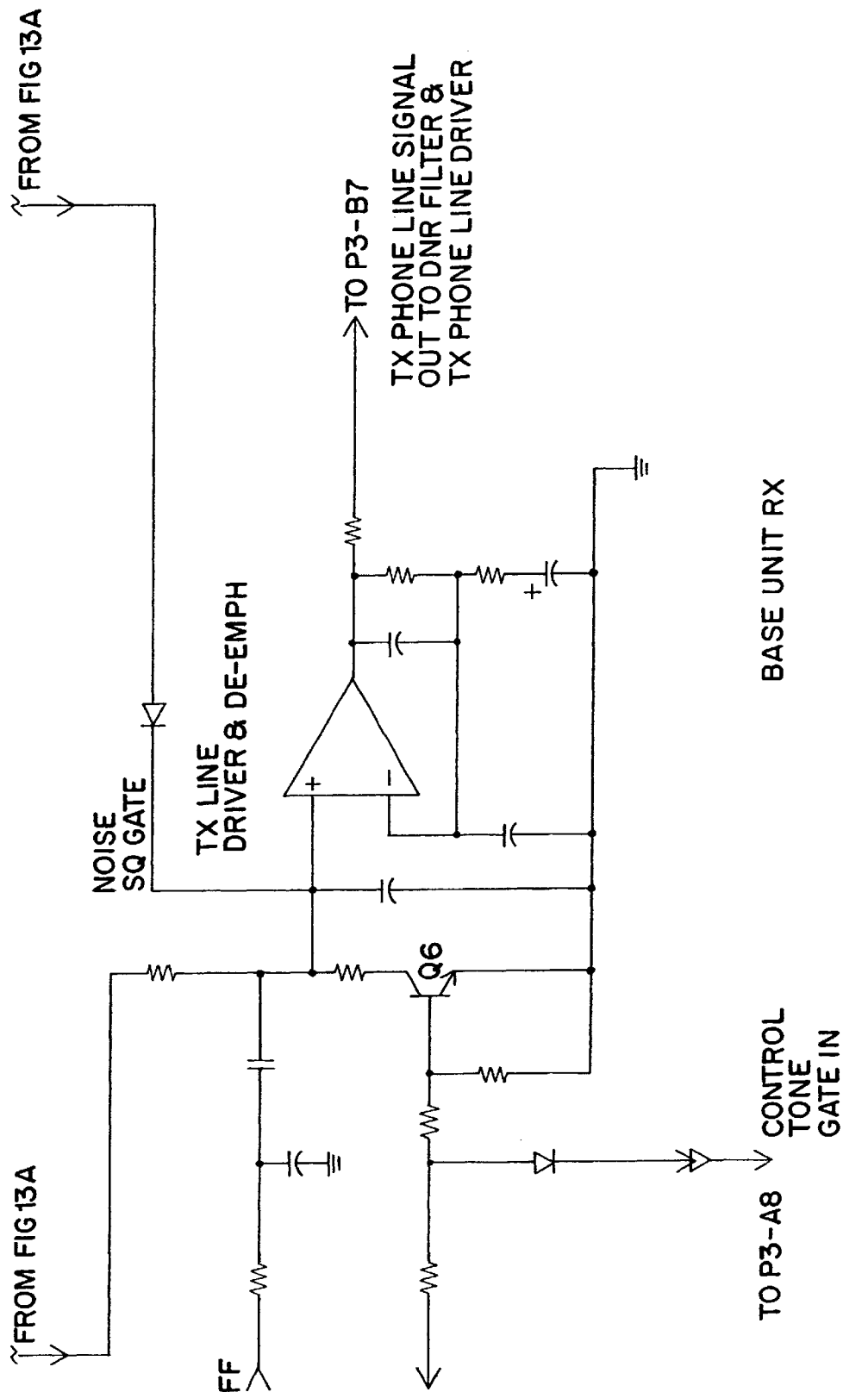

Referring to FIGS. 10 and 11, the output of the 3 Khz low pass filter 212 is additionally utilized for a control tone. The output of the 3 Khz low pass filter 212 is applied through a preamplifier 244, a 147 Hz bandpass filter 246 and a 147 Hz tone decoder 248 for tone discrimination. The output of the tone decoder 248 is returned to a NAND gate 214 which shuts off input to the amplifier 218 upon the presence of a tone and a zero voltage level from the decoder 248.

A noise squelch detector 240 is provided for improved audio quality. Squelching disables audio signal transmission to the telephone line when a very noisy signal or absence of a signal is sensed. The output of the quad detector 210 is applied to a 10 Khz bandpass filter and amplifier 236. The output of the bandpass filter and amplifier 236 is applied through a potentiometer 238 to the noise squelch detector 240. The output of the noise squelch detector 240 is applied to a comparator 242 with a threshold set by a reference.

The output of the comparator is then applied to the input of audio amplifier 218 to provide squelching.

A Dynamic Noise Reduction ("DNR") IC (U 202 on the Base Telephone/Interface pc board, LM1894 by NSC) is inserted between the base IR receiver and the transmitter line driver to reduce low level noise. DNR is a non-complementary noise reduction system which can provide over 13 Db of noise reduction as configured. DNR operation is dependent upon two principles: that the audible noise is proportional to system bandwidth (decreasing the bandwidth decreases the system noise) and that the desired signal is capable of "masking" the noise when the signal to noise ratio is high. DNR automatically and continuously changes the system bandwidth in response to the amplitude and frequency content of the audio to nearly eliminate the audible noise. Companders and expanders may be added to both links if higher signal to noise ratios are desired.

Figure 14:
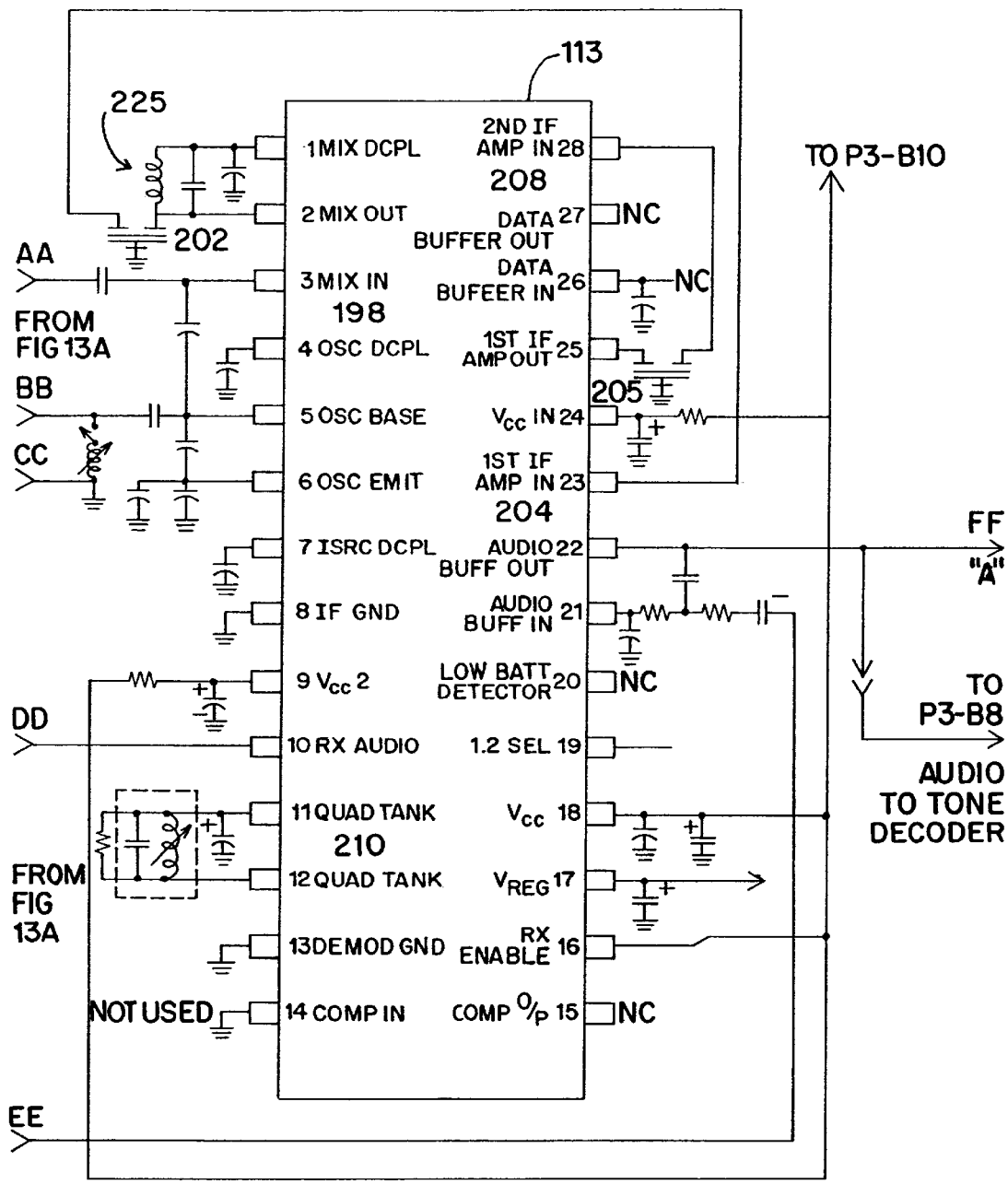
Figure 15A:
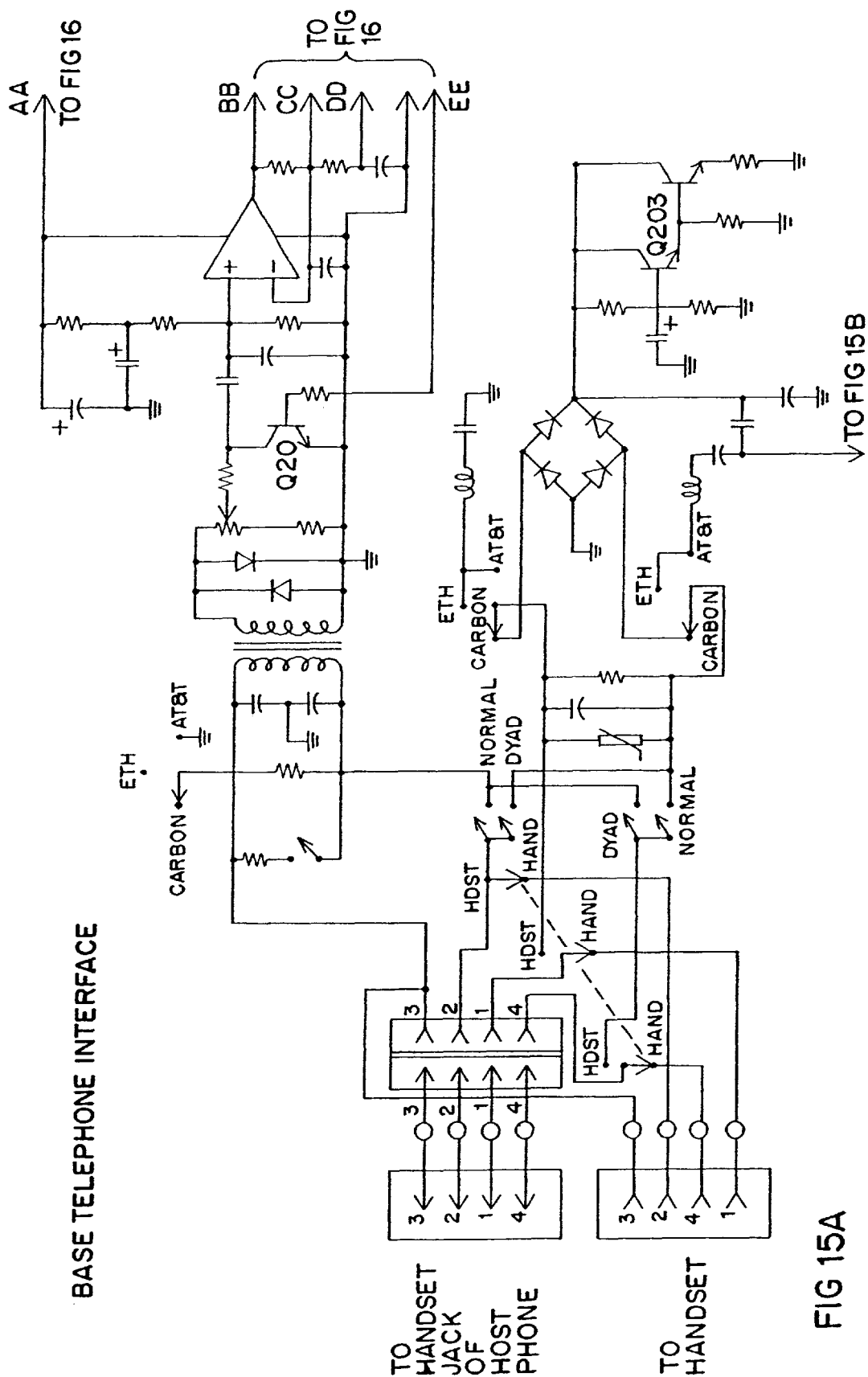
FIGS. 15 and 16 are detailed schematic diagrams of the base telephone interface.
Figure 15B:
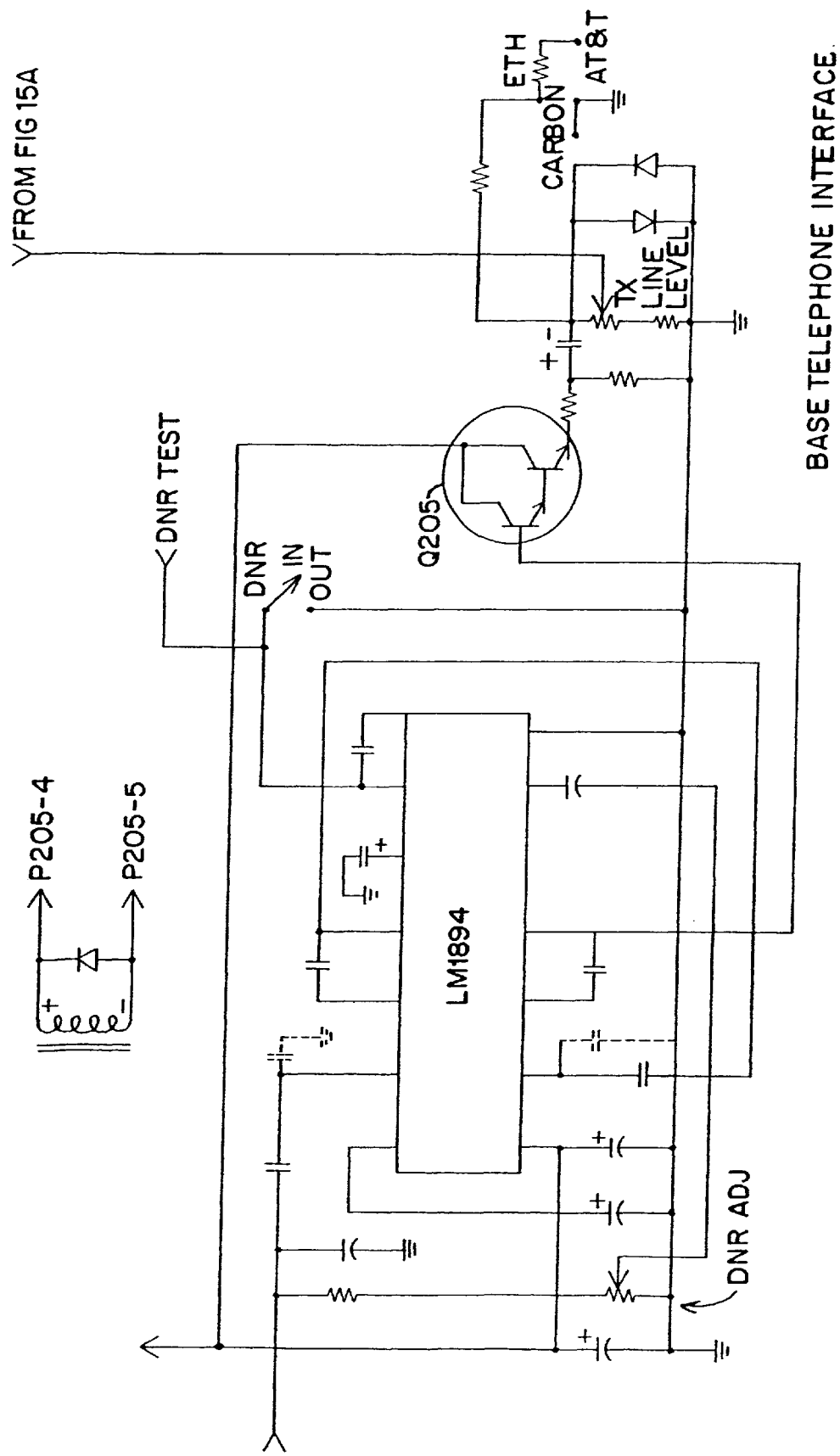
Figure 16:
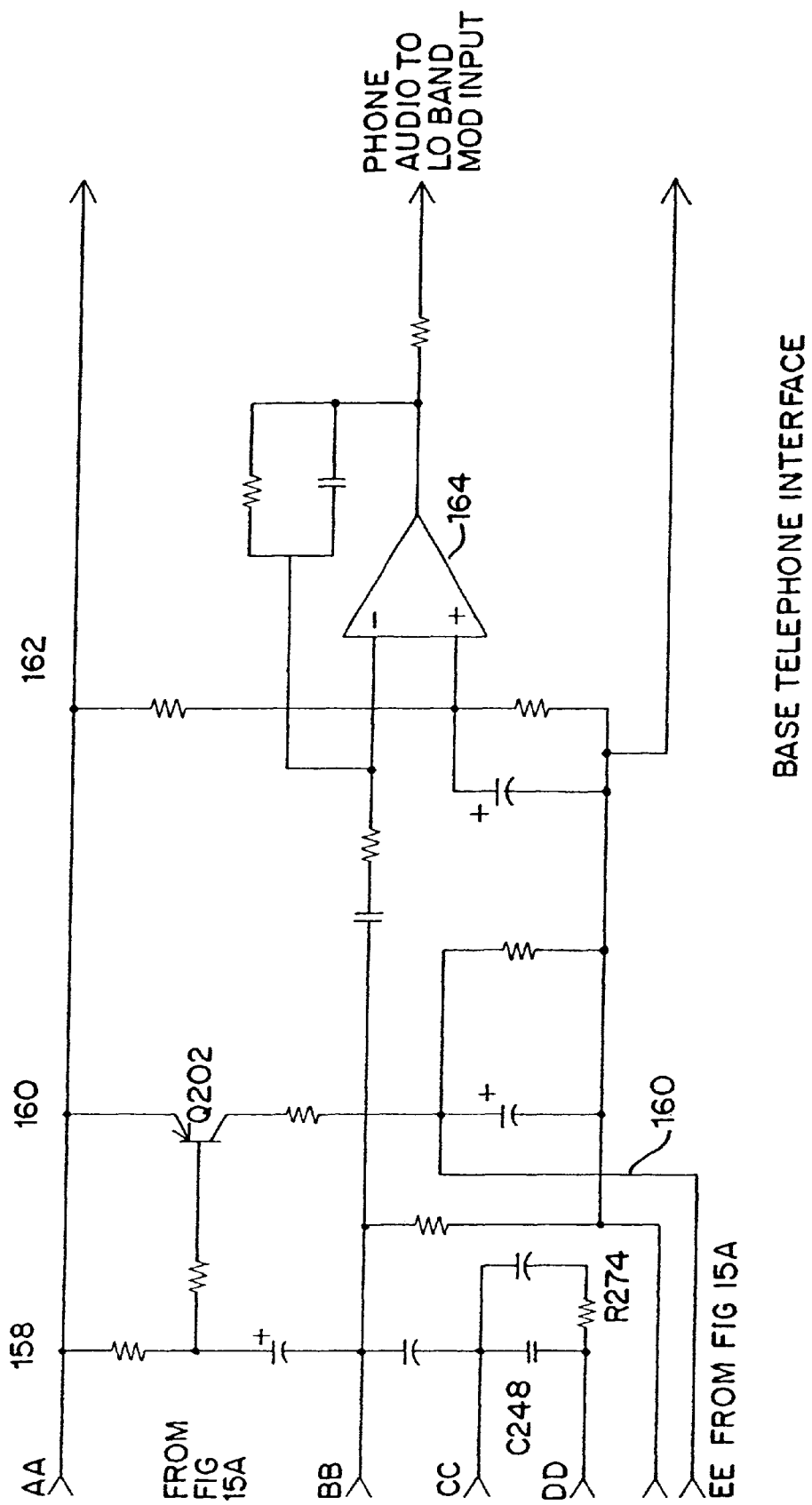

Referring to FIG. 14, a parallel resonant circuit 255 tuned to 455 Khz including C58 and L18 may be added to the mixer output of the base unit receiver. The purpose of this circuit is to eliminate spurious responses of the 455 Khz ceramic filters.

Referring again to FIGS. 10 and 11, the base station is responsive to tone control signals which are transmitted from the remote wireless set. More particularly, the base station can be turned ON and OFF by control signals from the remote wireless set. Tone control signals which modulate the IR transmitter from the remote wireless set are received by the PIN diodes at 192 and after detection and filtering propagate to the pre-amplifier 244, then to bandpass filter 246 and then to tone decoder 248. The output of the tone decoder 248 is applied to a NAND gate 250 along with the output of the comparator 242. The output of the NAND gate is applied to a long tone decoder 254, whose output is applied through an OR gate 256 to a DC switch 262. Regulated +12 volts system power interruption detected by a power ON-OFF sensor 260 is also applied to the OR gate 256. When the remote is inserted in the base charge cavity, charge current is sensed by charge current sense 257 and this is also applied to NAND gate 250.

With respect to the specific circuitry shown, the SCR within the long tone decoder 254 is unlatched in response to a long tone signal power interruption or remote charge current. The SCR switches off the regulated +12 volts to the VCO 168 and relay 154 through a power control transistor. The base station thus effectively turns OFF in response to the long control tone from the remote wireless set power interruption or remote unit charging.

Figure 17:
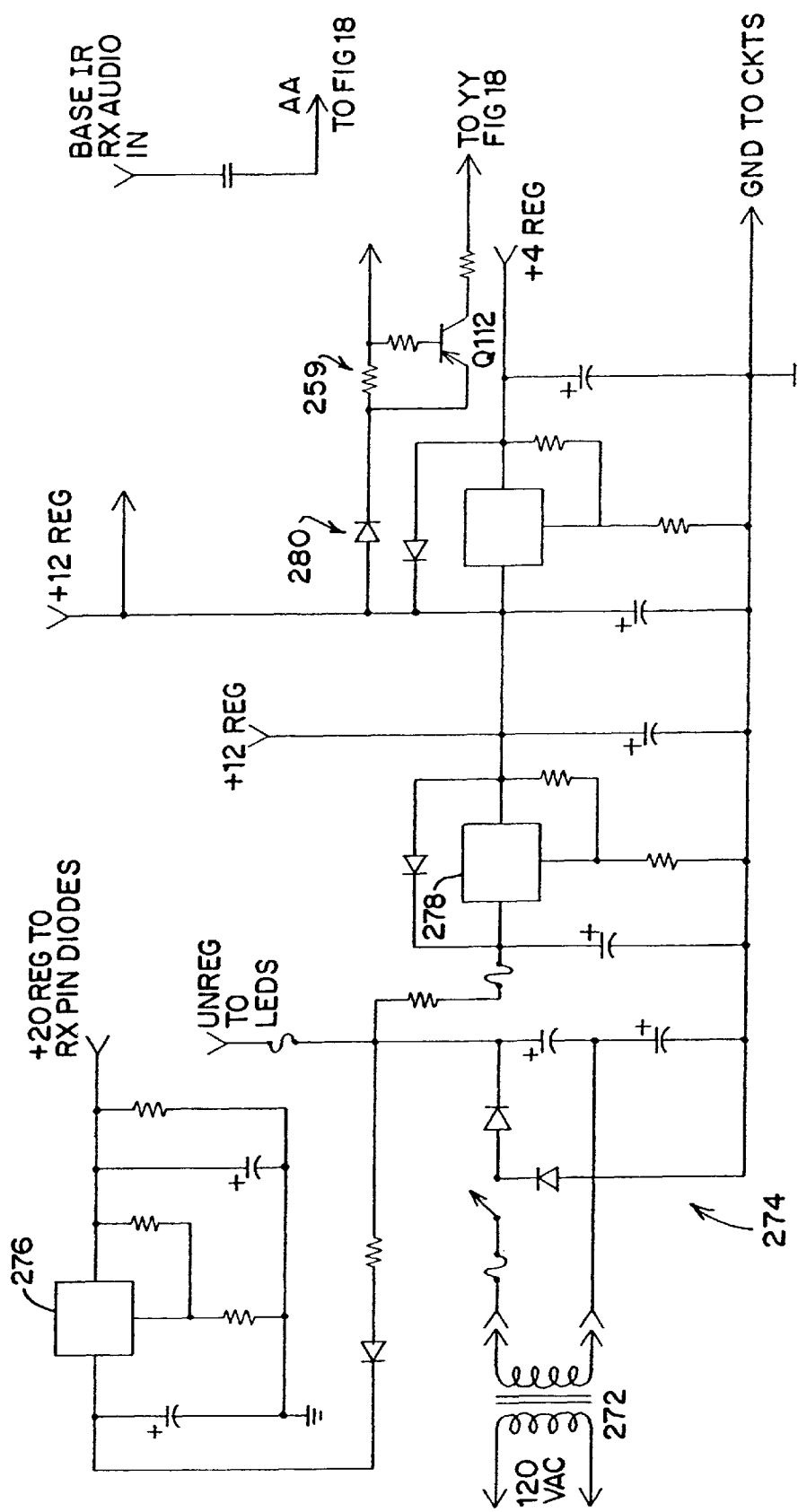

Referring to FIG. 17, the application of +12 volts to the base station power and control circuit and decoding of a short "ON tone" burst activates relay contacts which enable communication access through the base station and the remote wireless set rather than the normal telephone handset. A power supply provides power through a transformer 272 to a voltage doubler 274, and from there through a regulator 276 to back bias the base station PIN diodes. Additionally, a regulator 278 provides +12 V regulated. This is further applied through a regulator 280 to generate +4 V regulated. The output of regulator 278 is also used to power a charger circuit 281 through a current detector 259 which generates a signal to the OR gate 256 (FIG. 10) and switches the base transmitter off automatically when the remote unit is inserted in the charge cavity.

Referring to FIGS. 10, 11, 17 and 18, the base station turns ON in response to a short control tone from the remote wireless set. The presence of a short control tone from NAND gate 250 is detected through the charge rate indicator 252.

Transistor 253 and transistor 251 are switched ON and latched ON in response, thereby switching ON the +12 volts to the base station and turning the base station ON. Capacitor 260 differentiates the leading edge of +12 V when AC power is switched ON, and the leading edge is used to ensure that the base transmitter is switched to OFF when AC power is switched to ON or interrupted.

The base station also turns OFF in response to placement of the remote wireless set in the charging cavity. A signal yy indicating the flow of a charge current in the charge cavity 43 is generated when the remote wireless set is placed in the charging cavity 43. The signal yy is applied to the base of transistor 258, which operates to cut the +12 volts to the base station. More particularly, transistor 258 unlatches the transistor equivalent (251, 253) of an SCR by grounding the base of transistor 253. Hence, the base station is turned OFF automatically by placing the remote wireless set in the charging cavity.

Figure 6:
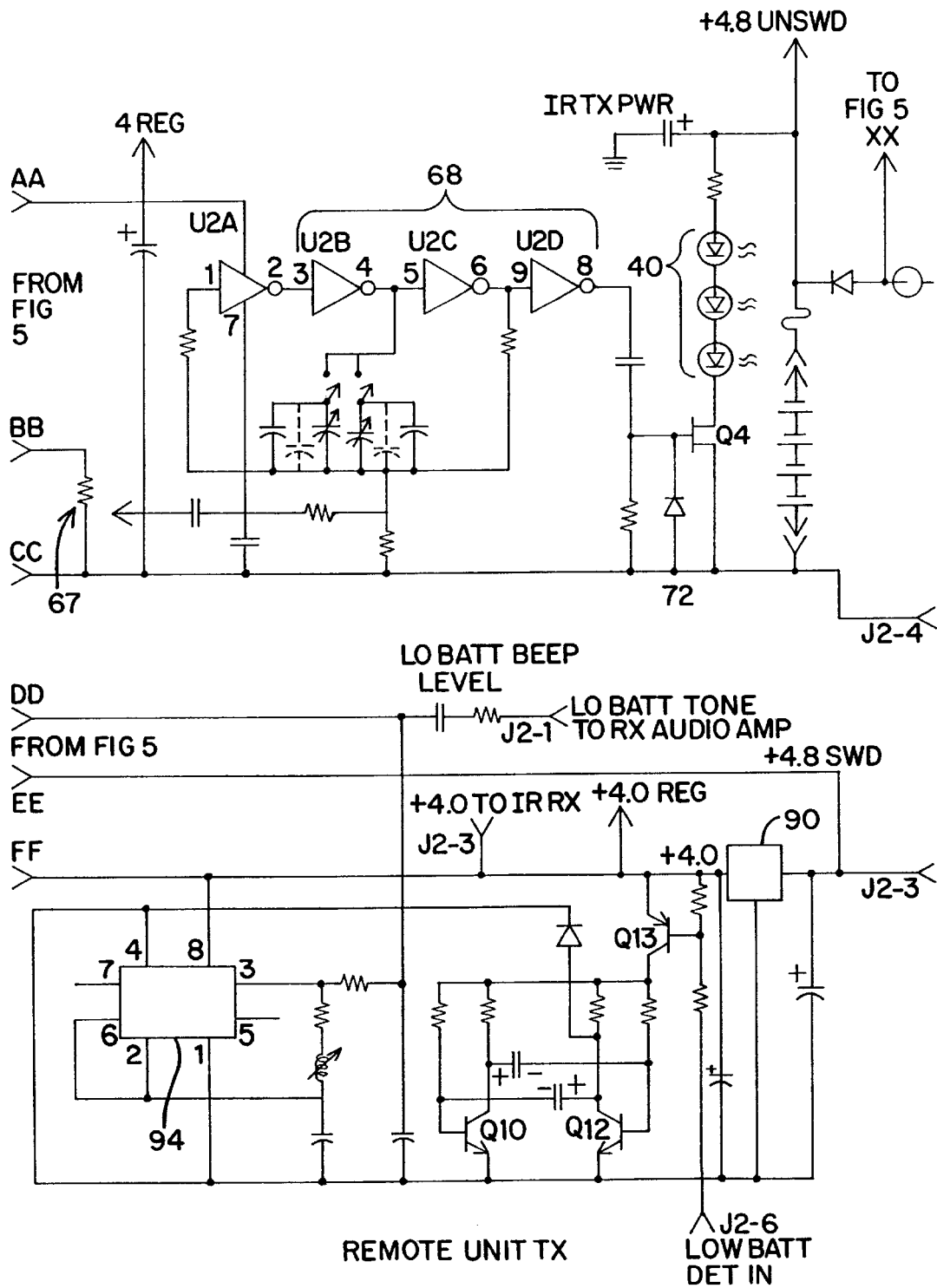

Referring to FIGS. 5 and 6, the remote wireless set may also include an input 270 (XX), which is operative to switch the remote wireless set OFF when it is placed in the charging cavity. The input 270 is triggered upon placement of the remote wireless set in the charging cavity and is applied to the base of DC power switch 86 and thereby functions to control application of +4.8 volts unswitched to the remote wireless set through the switch 86. Switching the remote wireless set OFF when it is placed in the charging cavity advantageously allows the remote wireless set to obtain a full battery charge and conserve power.

Referring generally to FIG. 1, it should be noted that the IR receiving PIN diodes are preferably isolated from the IR transmitting LEDs on both the remote and base units. While total isolation is not necessary, weak "birdies" and actual audio feedback from a demodulated signal can be prevented by forming a partition between, and using different windows for, the PIN diodes and LEDs. Further, the IR LEDs should have an angle of incidence to the window of at least 30 degrees so that most of the IR signal will pass through the window and not reflect off of the window surface. It has been found that an angle of incidence of approximately 40 degrees is optimum for achieving minimum loss through the window and a broad radiation pattern for the remote unit.

It should be understood that the invention is not limited to the particular embodiments shown and described herein, and that various changes and modifications may be made without departing from the spirit and scope of this novel concept as defined by the following claims.

What is claimed is:

1. A full duplex wireless communication system for use in connection with a telephone system, comprising:
   a first transceiver with a first transmit circuit and a first receive circuit, said first transceiver connected to the telephone system; and
   a second transceiver with a second transmit circuit and a second receive circuit, said second transceiver being remote from said first transceiver, wherein said first and second transmit circuits transmit frequency modulated signals and said first and second receive circuits receive said frequency modulated signals from said second and first transmit circuits, respectively, such that audio signals from the telephone system are: a) received in said first transceiver, b) converted to frequency modulated signals having a first current driven signal in a first frequency and a first carrier signal in a first wavelength, c) transmitted to said second transceiver, d) received by wavelength tuned infrared sensors in said second transceiver, e) converted in a first mixer back to audio signals, and f) presented to a user of said second transceiver, and further wherein audio signals from the user of the second transceiver are: a) converted to frequency modulated signals having a second current driven signal in a second frequency and a second carrier signal in a second wavelength, b) transmitted to said first transceiver, c) received by wavelength tuned sensors in said first transceiver, d) converted in a second mixer to audio signals and e) transmitted to the telephone system.

2. The communication system of claim 1 wherein the frequency modulated signals travel only within line of sight of the first and second transceivers.

3. The communication system of claim 2 wherein the frequency modulated signals are in the infrared spectrum.

4. The communication system of claim 3 wherein the infrared signals are transmitted directly between the first and second transceivers.

5. The communication system of claim 3 wherein the infrared signals are transmitted indirectly between the first and second transceivers by reflecting the signals upon other objects.

6. The communication system of claim 1 wherein selectivity in the second transceiver allows adjacent channels to be employed to allow greater than two transceivers to be independently utilized within a confined area.

7. The communication system of claim 1 wherein tone control signals directed from the second transceiver to the first transceiver cause at least one action selected from the group consisting of pick up, hang up, and operator flash.

8. The communication system of claim 1 wherein said first transmit circuit transmits in a first frequency band and said second transmit circuit transmit in a second frequency band, said first and second bands being non-overlapping.

9. The communication system of claim 8 wherein said first and second bands do not include overlapping harmonics.

10. The communication system of claim 9 wherein said first band is 250–430 Khz and said second band is 1.45–1.63 Mhz.

11. The communication system of claim 1 wherein said first transmit circuit and said second receive circuit are operative at said first wavelength, and said second transmit circuit and said first receive circuit are operative at said second wavelength, said first and second wavelengths being non-overlapping.

12. The communication system of claim 11 wherein said first wavelength is 940 nm and said second wavelength is 880 nm.

13. The communication circuit of claim 12 wherein said first and second transmit circuits include LEDs and said first and second receive circuits include tuned PIN diodes.

14. The communication circuit of claim 13 wherein lenses are employed to concentrate signals emitted by the LEDs.

15. The communication circuit of claim 13 wherein LED reflectors are employed to extend the range of the signals.

16. The communication system of claim 1 wherein said first transceiver is operational to turn OFF and to turn ON in response to tone control signals from said second transceiver.

17. The communication system of claim 1 wherein said second transceiver includes a battery from which said second transceiver is powered, and said communication system further includes a charging cavity operative to charge said battery, said second transceiver being operative to turn OFF in response to being placed in said charging cavity.

18. The communication system of claim 1 wherein said second transceiver includes a low battery indicator circuit which provides a signal indicative of a low battery condition to a user of said second transceiver.

19. The communication system of claim 1 wherein said second transceiver transmits signals with light emitting diodes (LEDs).

20. An improved method for transmitting audio signals between a telephone system and a remote wireless system including the steps of:
    receiving, in a base station, a first audio signal originating from the telephone system;
    transmitting the first audio signal from said base station to a remote wireless set by driving a first infrared generating component with a first frequency modulated current signal corresponding to said first audio signal, thereby producing a first frequency modulated signal;
    receiving, in the remote wireless set, said first frequency modulated signal with a first wavelength tuned infrared sensitive component and converting in a first mixer said first frequency modulated signal back to generate said first audio signal therefrom;
    receiving, in the remote set, a second audio signal originating from a user;
    transmitting said second audio signal from the remote set to the base station by driving a second infrared generating component with a second frequency modulated current signal corresponding to the second audio signal, thereby producing a second frequency modulated signal;
    receiving, in the base station, said second frequency modulated signal with a second wavelength tuned infrared sensitive component and converting in a second mixer said second frequency modulated signal back to generate said second audio signal therefrom;
    relaying said second audio signal to the telephone system;
    driving the first infrared generating component in a first frequency band and driving said second infrared generating component in a second frequency band, said first and second frequency bands being distinct from one another such that said first and second frequency bands do not overlap harmonically; and
    transmitting said first frequency modulated signal at a first wavelength and transmitting said second frequency modulated signal at a second wavelength, said first and second wavelengths being distinct from one another.

21. A communication system for use in connection with a telephone system, the communication system comprising:
    a base station connected directly to a telephone line of the telephone system, said base station including,
        a circuit capable of sensing an incoming telephone call on said telephone line,
        a circuit which converts audio signals to first frequency modulated signals within a first frequency band,
        infrared LEDs for transmitting said first frequency modulated signals at a first wavelength, wavelength tuned PIN diodes for receiving second frequency modulated signals at a second wavelengths, and a first mixer for converting said second frequency modulated signals in a second frequency band back to audio signals; and a remote wireless set including,
wavelength tuned PIN diodes for receiving said first frequency modulated signals at said first wavelength,
a second mixer for converting said first frequency modulated signals in said first frequency band back to audio signals,
a speaker for conveying audio signals to a user,
a microphone for sensing audio signals originating from a user of said remote wireless set,
a circuit for converting audio signals sensed by said microphone to second frequency modulated signals in said second frequency band, and infrared LEDs for transmitting said second frequency modulated signals at said second wavelength, wherein said first and second frequency bands are distinct from one another and said first and second wavelengths are distinct from one another, whereby the user of the remote wireless set can carry on a telephone conversation with a user of the telephone system via infrared frequency modulated signals.

22. The communication system of claim 21 wherein said base station transmits over a 250–430 Khz band and said remote wireless set transmits over a 1.45–1.63 Mhz band.

23. The communication system of claim 22 wherein base station LEDs transmit at a wavelength of 940 nm and said remote wireless set LEDs transmit at a wavelength of 880 nm.

* * * * *

UNITED STATES PATENT AND TRADEMARK OFFICE
CERTIFICATE OF CORRECTION

PATENT NO. : 6,421,426 B1
DATED : July 16, 2002
INVENTOR(S) : Robert E. Lucey

It is certified that error appears in the above-identified patent and that said Letters Patent is hereby corrected as shown below:

Column 9,
Line 45, "circuit transmit in" should read -- circuit transmits in --; and Column 11,
Line 3, "wavelengths," should read -- wavelength, --.

Signed and Sealed this

Fifth Day of August, 2003

JAMES E. ROGAN
*Director of the United States Patent and Trademark Office*